(12) United States Patent
Kostrzewski et al.

(10) Patent No.: US 8,376,760 B1
(45) Date of Patent: Feb. 19, 2013

(54) AVIONICS DATA STORAGE DEVICE AND TRANSFER SYSTEM WITH ELECTRO-OPTO-MECHANICAL IDENTIFICATION

(75) Inventors: Andrew Kostrzewski, Garden Grove, CA (US); Kang Lee, Woodland Hills, CA (US); Sookwang Ro, Glendale, CA (US); Thomas Forrester, Hacienda Heights, CA (US); Tomasz Jannson, Torrance, CA (US); Michael Alan Thompson, Redondo Beach, CA (US)

(73) Assignee: Physical Optics Corporation, Torrance, CA (US)

( * ) Notice: Subject to any disclaimer, the term of this patent is extended or adjusted under 35 U.S.C. 154(b) by 170 days.

(21) Appl. No.: 13/019,946

(22) Filed: Feb. 2, 2011

Related U.S. Application Data

(60) Provisional application No. 61/436,950, filed on Jan. 27, 2011.

(51) Int. Cl.
  *H01R 13/62* (2006.01)
(52) U.S. Cl. ............... 439/138; 235/493; 710/11

(58) Field of Classification Search .............. 710/11, 710/115, 313; 439/138, 137; 235/493, 492
See application file for complete search history.

(56) References Cited

U.S. PATENT DOCUMENTS

| | | | |
|---|---|---|---|
| 7,310,692 B2* | 12/2007 | Miller et al. | 710/11 |
| 7,699,630 B2* | 4/2010 | Kim | 439/136 |
| 7,822,883 B2* | 10/2010 | Miller et al. | 710/11 |
| 2006/0282553 A1* | 12/2006 | Miller et al. | 710/11 |
| 2007/0252010 A1* | 11/2007 | Gonzalez et al. | 235/492 |
| 2009/0261181 A1* | 10/2009 | Cheung | 239/129 |
| 2011/0174534 A1* | 7/2011 | Krietzman et al. | 174/520 |
| 2011/0261524 A1* | 10/2011 | Wieder et al. | 361/679.31 |

* cited by examiner

*Primary Examiner* — Gary F. Paumen
(74) *Attorney, Agent, or Firm* — Sheppard Mullin Richter & Hampton LLP

(57) ABSTRACT

An avionics data storage device and data transfer system are provided. The data storage device, has a slanted, "shark-like" door, which provides an environmental seal when not installed in the data transfer system. The storage device and data transfer system maintain environmental seals at all times other than installation. The storage device and transfer system can implement a variety of identification and authentication methods, including electrical, physical, and optical authentication or identification.

47 Claims, 26 Drawing Sheets

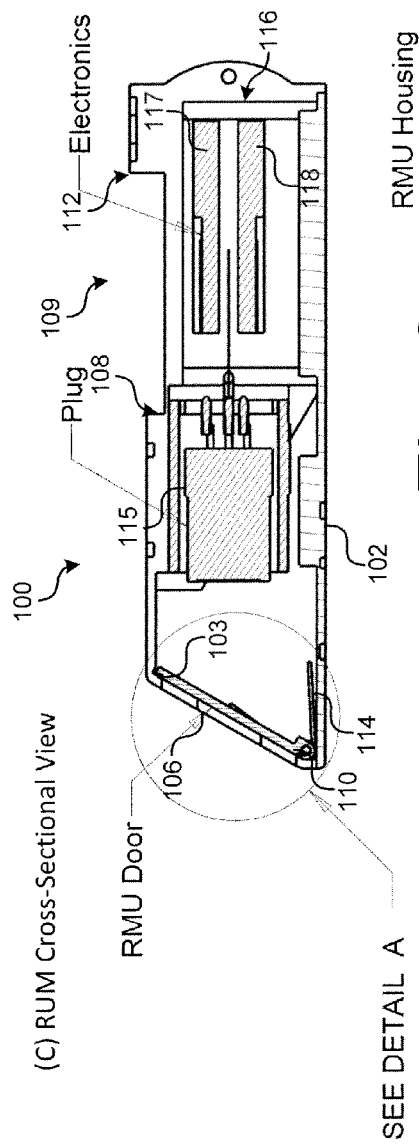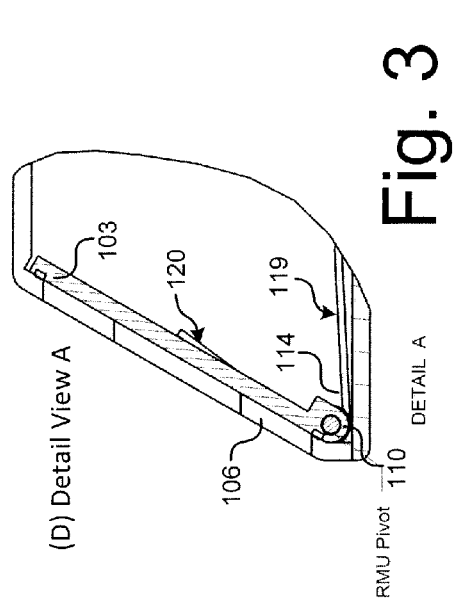

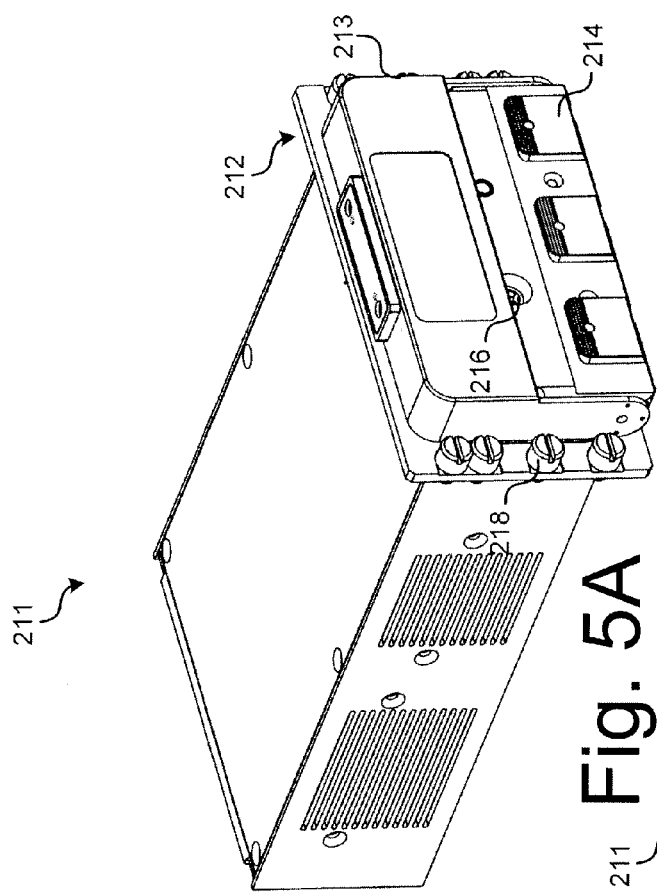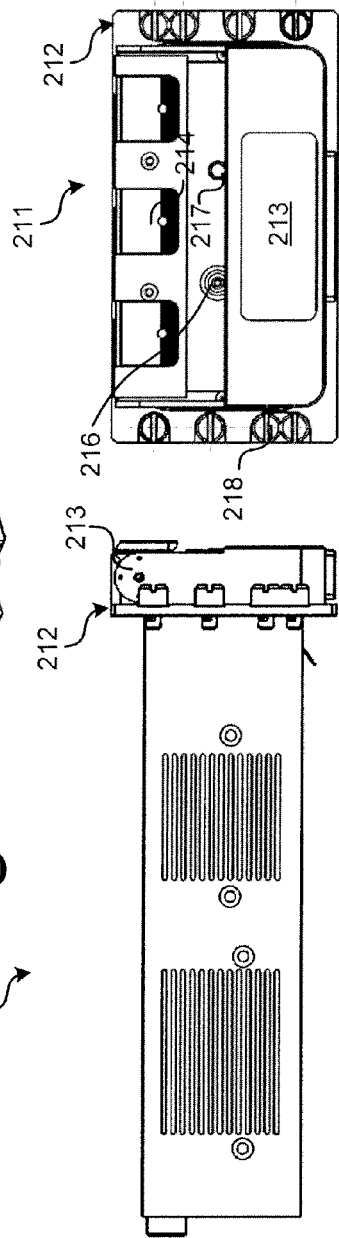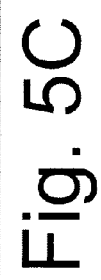

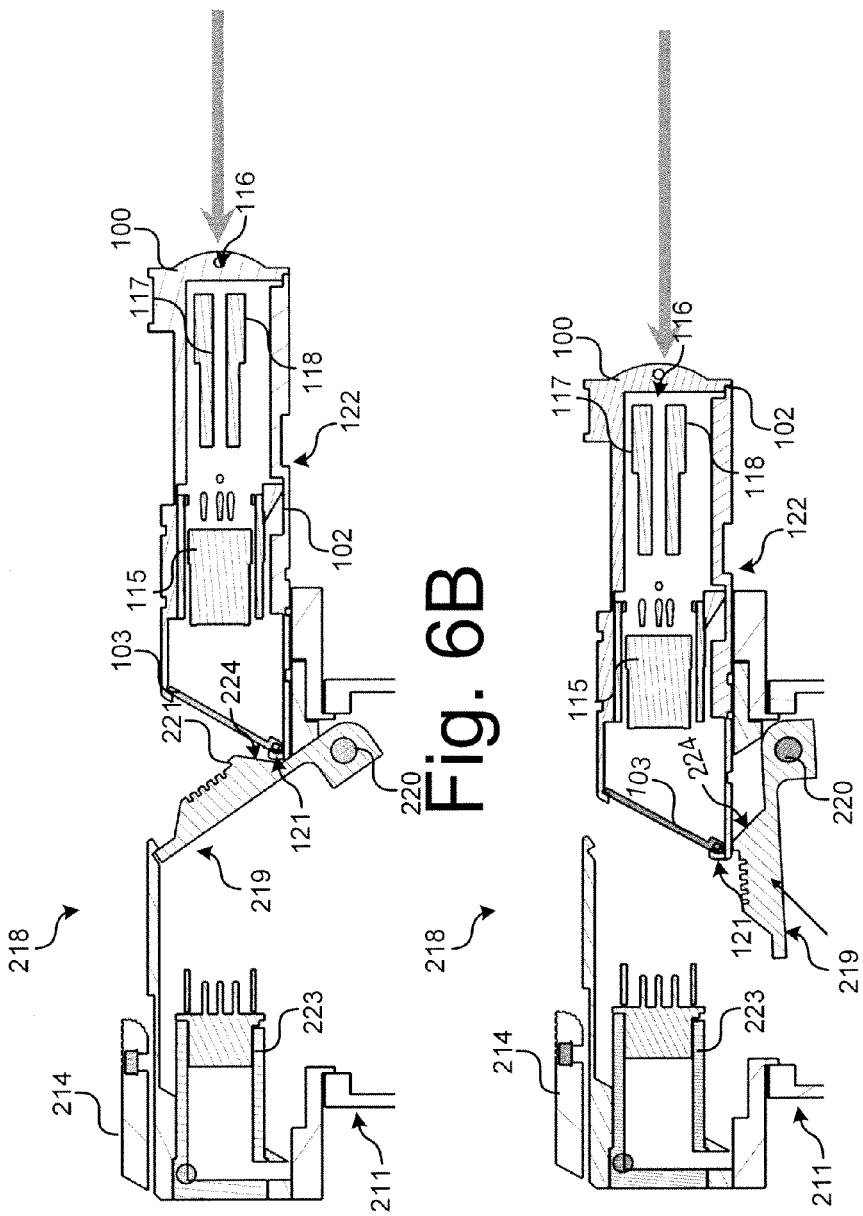

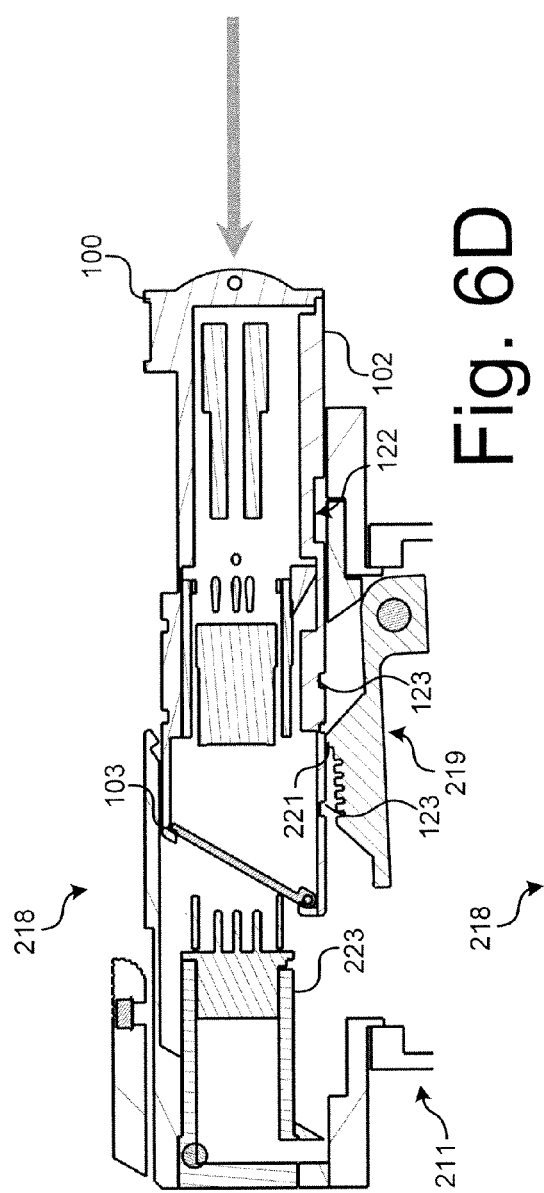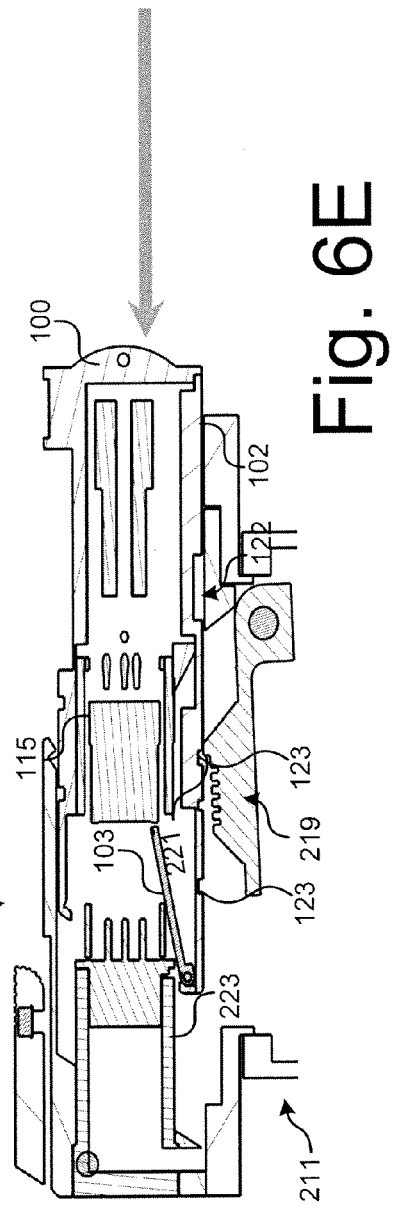

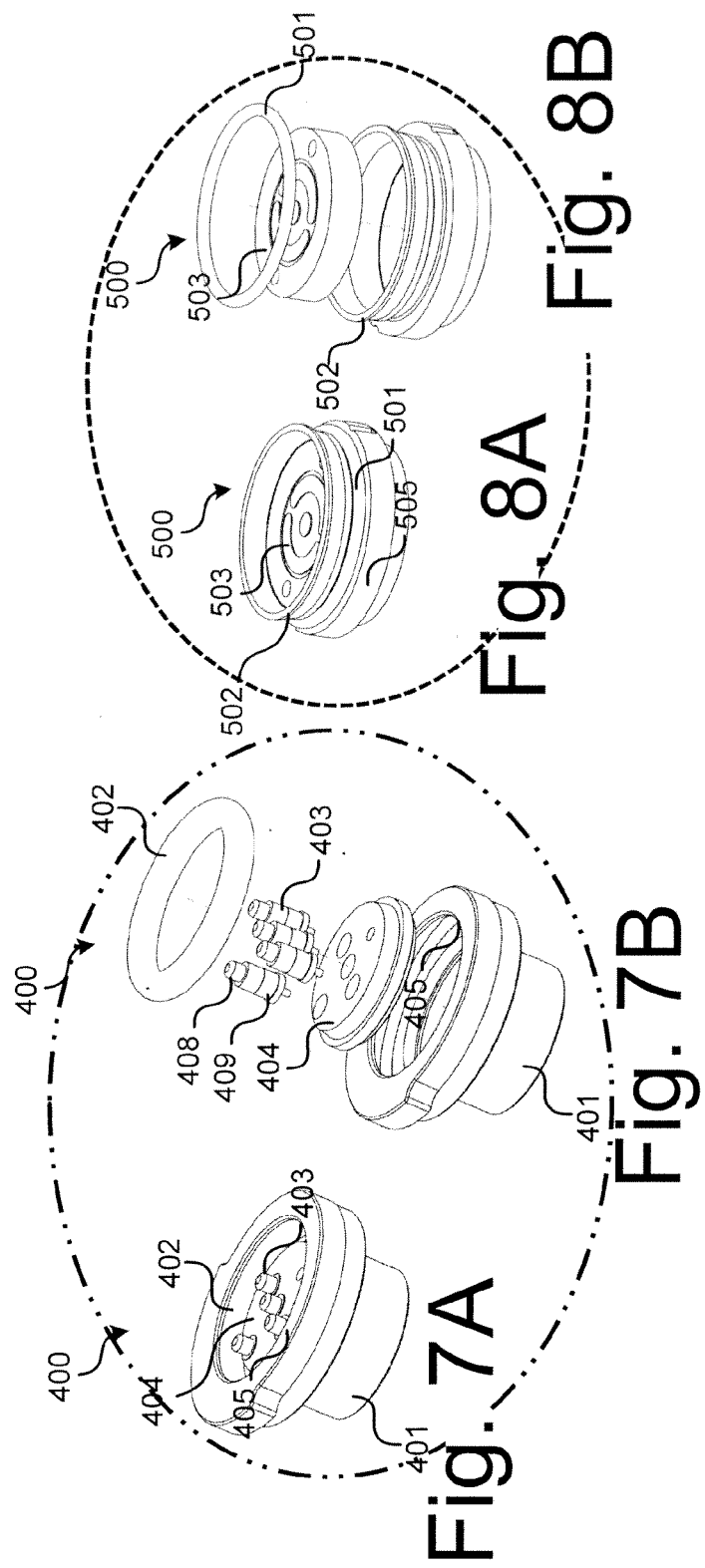

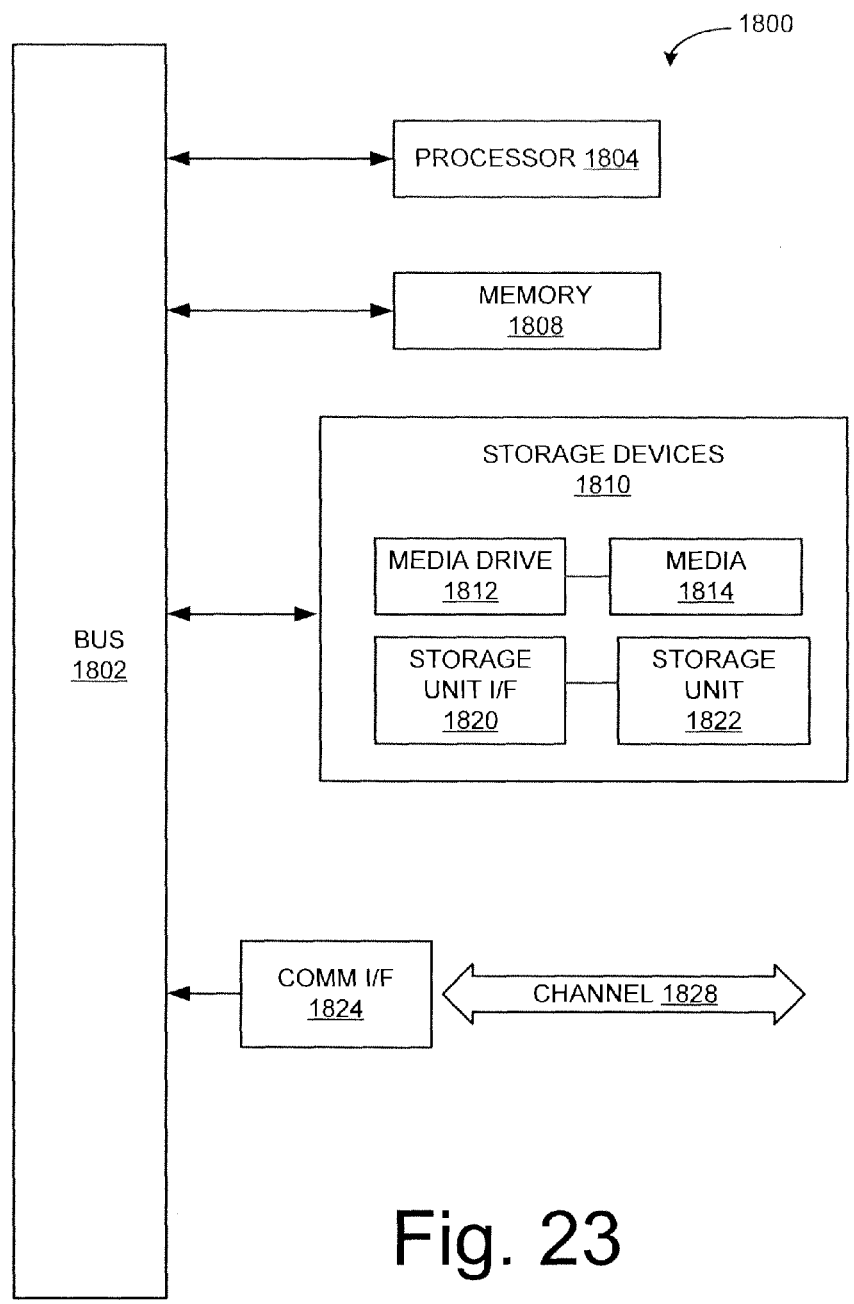

AVIONICS DATA STORAGE DEVICE AND TRANSFER SYSTEM WITH ELECTRO-OPTO-MECHANICAL IDENTIFICATION

CROSS-REFERENCE TO RELATED APPLICATIONS

This application claims the benefit of U.S. Provisional Application No. 61/436,950 filed Jan. 27, 2011 and which is hereby incorporated herein by reference in its entirety.

TECHNICAL FIELD

The present invention relates generally to data storage systems, and more particularly, some embodiments relate to environmentally sealed data storage devices with built-in authentication or identification.

DESCRIPTION OF THE RELATED ART

Removable memory units, such as USB flash drives typically comprise a connector coupled to a memory storage device. They are configured to connect to data interfaces to allow data to be transferred between the removable memory unit and a computer system. The connectors are often exposed to the elements, and can be damaged by environmental contaminants. Some removable memory units are equipped with caps to protect their connectors. However, caps must be manually removed before connection, and during this time the connectors are exposed to the environment.

BRIEF SUMMARY OF EMBODIMENTS OF THE INVENTION

Various embodiments of the invention provide a housing for a removable memory unit (RMU) that interfaces with a receiving bay to provide an environmental seal while connected and while disconnected. In various embodiments, memory housed in the RMU is of a predetermined type, and the electronic interface identifies what type of memory is housed in a particular RMU. In some embodiments, an optical authentication system, for example contained in optical fiber in both the bay and RMU allows identification of authentic RMUs for security purposes. In further embodiments, physical keyways in the housing and bay mechanically identify an RMU and causes it to only be insertable in the proper bay. Accordingly, various aspects of the RMU combine to provide information assurance.

In some embodiments, a plurality of RMU bays is coupled to a data transfer module. This allows information stored on a plurality of RMUs to be loaded onto a plurality of various remote machines. In some embodiments, the data transfer module establishes a plurality of virtual data paths between the RMUs and their respective remote machines, allowing secured, unsecured, protected, or un-protected data and processes to coexist in the system. In a further embodiment, RMUs are provided with both a connector that allows transfer of a first type of data, such as non-sensitive data and a second connector that allows transfer of a second type of data, such as sensitive data. In particular embodiments, the ports may be configured according to RED/BLACK data separation as used in the security industry or specified in TEMPEST guidelines. The RMU bay and data transfer module is equipped with switching logic to connect the appropriate port for the present use of a particular RMU.

According to an embodiment of the invention, a memory system, comprises a removable memory unit (RMU) bay, the RMU bay comprising a first doorway and a first hinged door, the first hinged door being biased in a closed position to close the first doorway and configured to open inward toward the interior of the RMU bay; a data transfer module comprising a first electrical connector, the first electrical connector being housed in the interior of the RMU bay and being exposed when the first hinged door is opened; and an RMU comprising a housing and a computer readable storage medium coupled to a second electrical connector configured to mate with the first electrical connector, the computer readable storage medium and second electrical connector disposed within the housing, and the housing comprising a second doorway and a second hinged door, the second hinged door being biased in a closed position to close the second doorway and configured to open toward the interior of the RMU to expose the second electrical connector; wherein the first hinged door is configured to be opened by contact with the RMU housing during insertion of the RMU through the first doorway, and wherein the second hinged door is configured to be opened by contact with the first electrical connector after the RMU is inserted through the first doorway.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 2 illustrates a side cut-away view of an RMU implemented in accordance with an embodiment of the invention.

FIG. 3 illustrates a detailed side cutaway view of the door area.

FIGS. 5A-5E illustrate a RMU bay coupled to a data recorder and implemented in accordance with an embodiment of the invention.

FIGS. 6A-6G illustrates a mating and de-mating sequence between an RMU and bay.

FIGS. 7A and 7B illustrate a receptacle that may be used in an RMU bay in accordance with an embodiment of the invention.

FIGS. 8A and 8B illustrate a plug corresponding to the receptacle of FIGS. 7A and 7B.

FIG. 23 illustrates an example computing module that may be used in implementing various features of embodiments of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Before describing the invention in detail, it is useful to describe a few example environments with which the invention can be implemented. One such example is that of an avionics data system. For example, the invention may be implemented in conjunction with mission computers, display computers, air data computers, data recorders, general storage devices, maintenance computers, logistics computers, health monitoring systems, navigations systems, control systems, or other avionics systems. These avionics systems may be installed in aircraft, such as fixed or rotary wing aircraft. In these implementation removable memory unit (RMU) may store data relevant to the aircraft's operation, previous and past status, health, mission, or other such data. During use, an operator manually installs an RMU in an RMU bay disposed in the aircraft. This can occur in harsh environments and under rugged conditions. For example, the operator may be using gloves, wearing headgear, and may be likely to jar or drop the RMU. The environment may include vibration, noise, moisture or water, salt water, dirt, dust, or other potentially detrimental factors. Other possible environments include ground vehicles, ground base stations, or other harsh environments that may benefit from rugged and environmentally sealed removable memory.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 1:
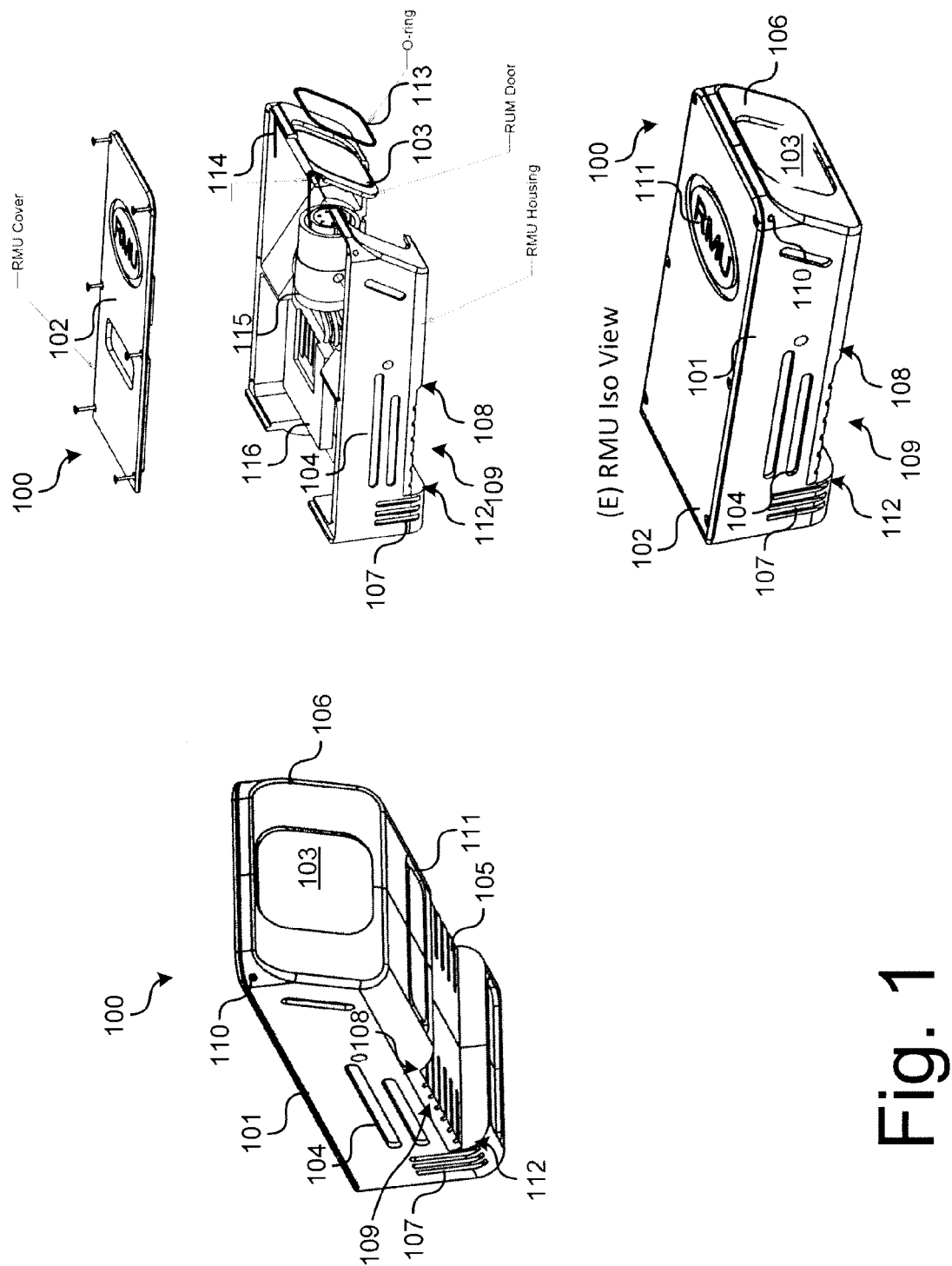
FIG. 1 illustrates a removable memory unit (RMU) implemented in accordance with an embodiment of the invention.

FIG. 1 illustrates a removable memory unit (RMU) implemented in accordance with an embodiment of the invention. The figure illustrates three isometric views of an RMU 100, with one as a view with panel 102 removed. The RMU 100 comprises a housing 101 and a back panel 102. In other embodiements, the housing 101 and panel 102 may comprise one integral housing. The housing 101 comprises a front portion comprising planar surface 106 that is inclined with respect to the panel 102. The front 106 comprises a portal for a door 103. The door 103 is spring loaded using an elastic element or structure or other tensioning device, such as spring 114, to bias the door in the closed position. In the illustrated embodiment, spring 114 comprises a torsion spring; other embodiments may utilize other methods of biasing door 103 in the closed position.

The RMU housing 101 further comprises one or more grooves 104 on the sides of the housing. In some embodiments, grooves 104 can be included to provide grips for use of the RMU 100. These grooves 104 can also allow for physical keying of the housing 101. A plurality of other grooves, 107 and 105, provide for gripping during insertion and removal of the RMU 100. The housing may further comprise one or more areas 111 configured for labeling the RMU to allow visual identification during use. The housing 101 further comprises an indentation 109 formed by a planar bottom surface and two perpendicular surfaces 112 and 108. This indentation 109 provides a grip location that does not require gripping the sides during insertion and removal, allowing multiple RMUs 100 to be spaced close together during operation.

The panel 102 is preferably affixed to the housing 101 in a sealed manner, for example, using screws or other fastening mechanisms and an environmental seal. When in the closed position, the door 103 shuts the portal on the front panel 106, environmentally sealing the RMU 100. In some embodiments, an O-ring 113 is disposed between the portal and the door to complete the environmental seal. Within the RMU, an electromechanical connector plug 115 is disposed behind the door 103, at a sufficient distance to provide clearance and allow the door 103 to open inward during insertion. In some embodiments, the plug 115 comprises any of a variety of commercial off-the-shelf (COTS) connectors. In other embodiments, the plug 115 may comprise a specialized connector, an example of which is described below. The connector 115 is coupled to and provides an interface to electronics 116. In the illustrated embodiment, the electronics 116 comprise memory electronics including a controller and storage media, although other electronic components can be interfaced. For example, in some embodiments, electronics 116 may comprise a printed circuit board (PCB) controller coupled to a storage media. The storage media may comprise flash memory, or any other suitable storage media, such as NVRAM.

In another embodiment, in place of, or in addition to, O-ring 113, the door 103 may be coated in an elastomeric material. To reduce dirt or other contaminates from adhering to the door 103, the elastomeric material may be coated or impregnated with, or have embedded therein, a low friction material such as polytetrafluoroethylene (PTFE). For example, in one embodiment, the elastomeric material comprises silicone impregnated with PTFE.

FIG. 2 illustrates a side cut-away view of an RMU implemented in accordance with an embodiment of the invention. As illustrated in this view, the front panel and portal 106 are angled at an incline with respect to the bottom of the housing 102. The plug 115 is set back from the door 103 to allow the door 103 to swing inward during mating when the RMU is inserted into a data loading module. In some implementations, for example where space is at a premium, the distance between the door 103 and plug 115 is minimized to allow only enough room, with a predetermined clearance margin, to allow the door 103 to swing inward and clear the plug 115 during mating.

In another embodiment, the door 103 could comprise a double-door. With an upper portion and a lower portion, or alternatively, a left portion and a right portion. In these embodiments, a second spring system may be employed to maintain the second door portion in a closed position. Although this increases the number of moving parts, each door portion has half the width of the door 103, reducing the total length of RMU 100 required to allow the door portions to open while clearing plug 115.

In the example environment, the plug 115 is coupled directly or indirectly to memory electronics 116. Memory electronics 116 in one embodiment comprises a controller 117 and a storage medium 118. In some embodiments, the controller 117 controls access and formatting between the data transfer unit and the storage medium 118. In further embodiments, the controller 117 may be equipped with further functionality. For example, in one embodiment the controller 117 is configured to wipe or zeroize all data on the memory 118. If memory 118 is volatile memory, such as RAM, this wiping procedure may comprise disconnecting memory 118 from an internal power source and shorting contacts to eliminate any residual charge. If memory 118 comprises non-volatile memory, such as flash memory, then the wiping procedure may comprises writing binary zeros or binary ones, or some other random or pseudorandom bit pattern, to the memory 118. In still further embodiments implementing separate circuits, for example for unsecured or secured data, the controller 117 may be configured to switchably activate the separate circuits.

FIG. 3 illustrates a detailed side cutaway view of the door area in accordance with one embodiment of the invention. The spring 114 in this example comprises a torsion spring having a first end 119 disposed against the bottom panel 102, and a second end 120 disposed against the door 103. The spring 114 twists about the pivot point 110 to bias the door 103 in the closed position against the panel 106. During mating with the data transfer device, the RMU door 103 pivots about the axis 110 to contact the panel 102. In one embodiment, the angle of the panel 106 increases the lifetime of the spring 114. Torsion springs have significantly increased lifetimes when their maximum deflection angle is kept to less than a certain percentage (for example, 35%) of their suggested maximum deflection. Accordingly, by using a torsion spring rated for high deflection (such as 210°) and angling the panel 106, the spring's 114 lifetime may be increased. In particular embodiments, the panel 106 is angled between about 40° and 60°, and in a particular embodiment, the panel 106 is angled at 55°. Additionally, a torsion spring may have a fixed or varying spring constant throughout the spring's range of motion. In embodiments where a varying spring constant is presented, reducing the spring's range of motion by angling the panel 106, allows the force provided by the door 103 to be substantially constant through the door's 103 range of motion.

FIG. 4 illustrates three alternative examples of seals for the RMU door.

As would be apparent to one of ordinary skill in the art, selection of materials and geometries for the seal is typically based on several factors. These can include factors such as chemical compatibility, application temperature ranges, sealing pressure provided by the door tensioning mechanism, cost considerations, and durometer. Materials can include a variety of typical scaling materials including natural and synthetic rubbers and polymeric materials.

Figure 4C:
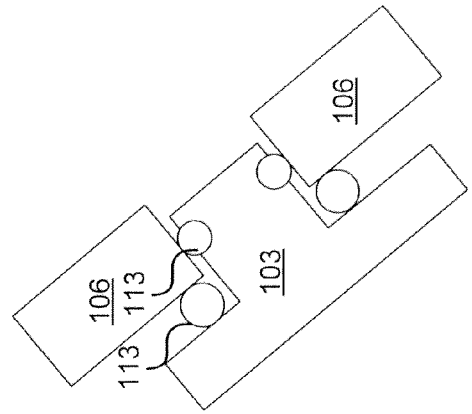
FIG. 4C illustrates an alternative placement of a gasket in a door closure system.
Figure 4B:
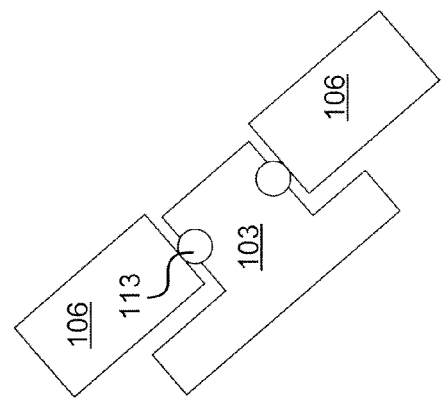
FIG. 4B illustrates an alternative placement of a gasket in a door closure system.
Figure 4A:
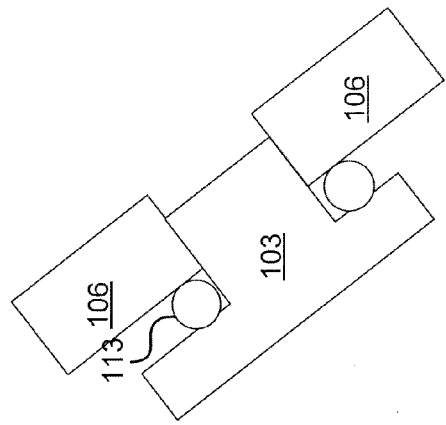
FIG. 4A illustrates the closure of a door where the door abuts the front panel and closes the aperture in panel.

In FIG. 4A the door 103 abuts the front panel 106 and closes the aperture in panel 106. A mechanical seal, such as a gasket or O-ring 113 is disposed between the panel 106 and the door 103. As the door 103 is closed by the spring 114, the gasket 113 is compressed between the door 103 and the panel 106. In the illustrated embodiment, portion of the door 103 projects in the aperture of the panel 106 to provide an interference or friction fit to further seal the door.

In FIG. 4B, the O-ring 113 is disposed between the projecting portion of the door 103 and the sides of the aperture of panel 106. In this embodiment, the O-ring 113 effectively reduces the opening size of the aperture 106 in a resilient manner. As the door 103 is closed by the spring 104, the projecting portion is squeezed into the aperture by deforming the O-ring 113, thereby creating an increased friction fit and an environmental seal. In FIG. 4C, a plurality of gaskets 113 are provided. A first gasket provides a compression seal as in FIG. 4A, while a second gasket 113 provides a transverse increased friction fit as in Figure B.

Figure 5E:
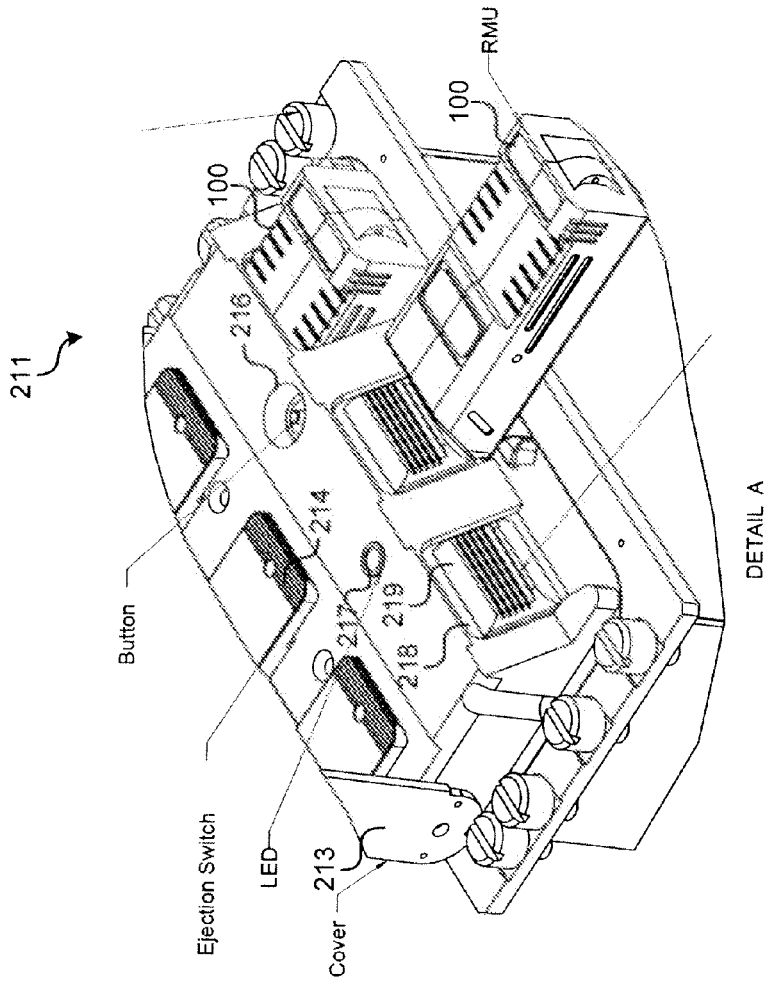
Figure 5D:
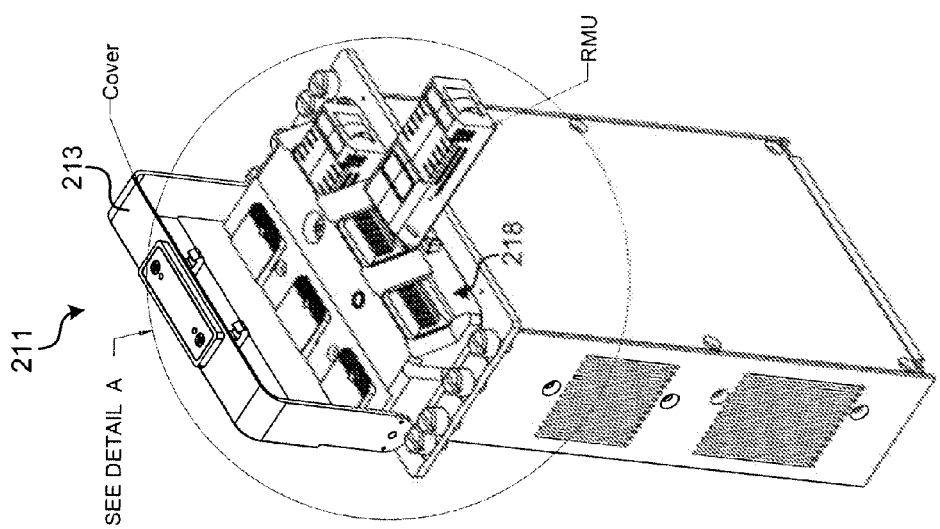

FIGS. 5A-5E illustrate an RMU bay coupled to a data recorder and implemented in accordance with an embodiment of the invention. In the illustrated embodiment, a data recorder 211, such as a flight data recorder or a map storage system, comprises a main body mounted on the airframe of an aircraft via faceplate 212 and ¼-turn Dzus screws 218. A panel cover 213 protects the RMU bays from accidental operation or damage. A plurality of eject switches 214 are disposed on the faceplate 212 to allow mated RMUs to be removed. One or more LEDs 217 or other indicators indicate the status of inserted RMUs. For example, the LED 217 may comprise a uni-, bi-, or tri-color LED, and may indicate status of the most recently inserted RMU by its color or by blink-code (or both). A switch 216 is disposed on faceplate 212 to allow manual erasure of the contents of the memories of any currently mounted RMUs. For example, the switch 216 may comprise a momentary-contact single-pole single-throw (SPST) pushbutton switch. In FIGS. 5D and 5E, the cover 213 has been pulled back, illustrating the RMU bays 218. As illustrated, the RMUs 100 slide into the bays 218 through doors 219. After the RMUs 100 are fully inserted into the bays 218, the cover 213 may be pulled back down to protect the RMUs 100.

Figure 6A:
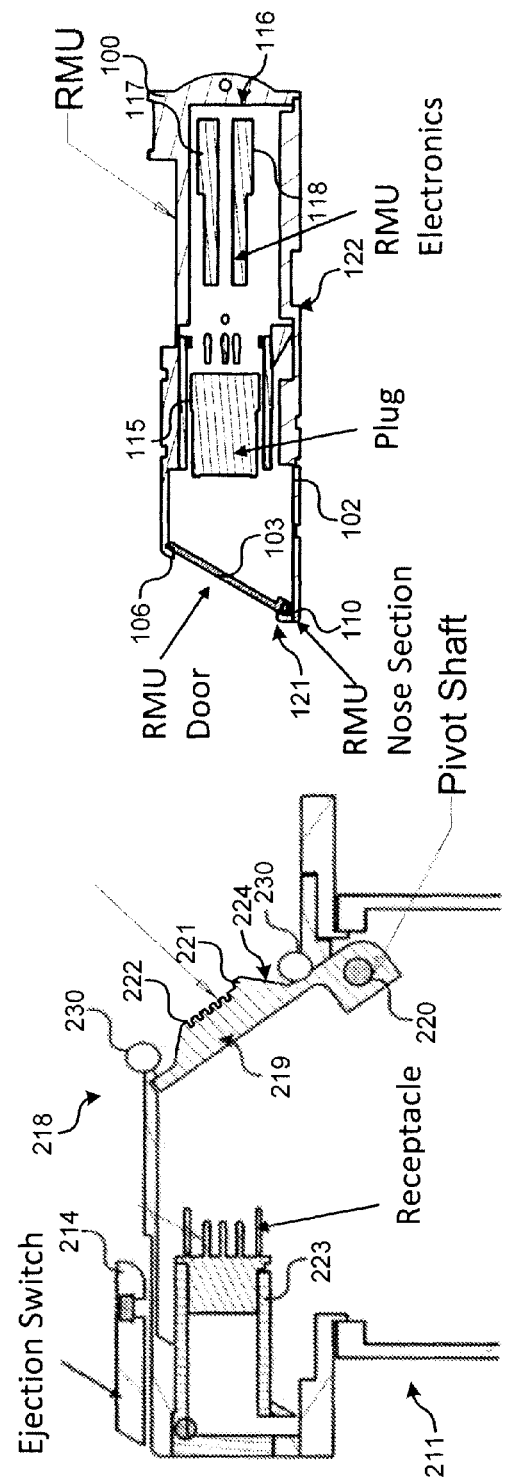

FIG. 6A illustrates further details of an RMU and bay in accordance with one embodiment of the invention. The example of FIG. 6A illustrates an initial configuration in a mating sequence implemented in accordance with an embodiment of the invention. As illustrated, the bay 218 comprises the door 219. The door is configured to rotate inward about pivot point 220 when the RMU 100 is inserted. Similarly to the RMU, one or more torsion springs may be installed to maintain the door 219 in a biased closed state. In some embodiments, a larger O-ring or wiper 230 may be disposed around the door 219, attached to the RMU bay housing. In these embodiments, the wiper 230 is configured to remove dirt or other contaminants from the housing 101 and 102 of the RMU during mating. The wiper 230 may also serve to protect the RMU 100 and bay 218 during mating from the environment.

The door in this example further comprises a projection 221, such as a toe wedge. The projection 221 engages with an indentation 122 on the panel 102 of the RMU 100 when the RMU is fully installed in the bay. This causes a fully-installed RMU 100 to lock into place with a "click-action" providing haptic (i.e., tactile) and acoustic feedback and confirmation of proper installation. Ejection lever 214 disengages the toe wedge 221 from associated RMU 100, de-mates the electromechanical connector pair electrically coupling the RMU to the avionics recorder and mechanically pushes (i.e., partially ejects) the associated RMU out of the avionics recorder, preparing it for complete removal manually once cover 213 is opened.

A series of ridges 222 provide haptic feedback when the RMU 100 is inserted at an angle, as described below. The bay further comprises a receptacle 223 or female connector corresponding to the plug connector 115 in the RMU. The receptacle 223 is coupled to the electrical system of the module 211. As illustrated, prior to initial installation in the bays 218, both the RMU 100 and bay 218 are protected from the environment by sealed doors 103 and 219, respectively.

FIG. 6B illustrates the initial installation process for an example RMU. As illustrated, the front nose section 121 of the RMU 100 contacts the leading edge 224 of the bay door 219. This causes the door 219 to begin opening inward. FIG. 6C illustrates the process after the RMU 100 has been pushed further into the bay. The leading portion 121 of the RMU 100 has pushed the door 219 completely open. As illustrated, the RMU door 103 remains sealed through this process.

FIG. 6D illustrates further insertion of the RMU 100 into the bay 218 in accordance with the example insertion process. As the RMU is inserted farther into the bay, the leading edge of receptacle 223 comes into contact with the leading edge of door 103. This causes the door 103 to begin opening inward, ultimately breaking the environmental seal of RMU 100. Accordingly, as illustrated, the connector 100 is sealed from the environment until immediately before electrical coupling when RMU 100 is fully disposed within the RMU bay 218. In the illustrated embodiment, as the RMU 100 is inserted, the projection 221 engages and disengages with small indentations 123 disposed on the panel 102 of the RMU. In this example, these indentations 123 are too small to fully engage with the projection 221, but provide a haptic response to allow the user to feel the continued insertion of the RMU. These can be configured to also provide a clicking or like sound as the RMU is inserted, providing auditory feedback and confirmation of installation. In FIG. 6E, the door 103 is shown as being almost fully opened by the leading edge of receptacle 223.

Figure 6F:
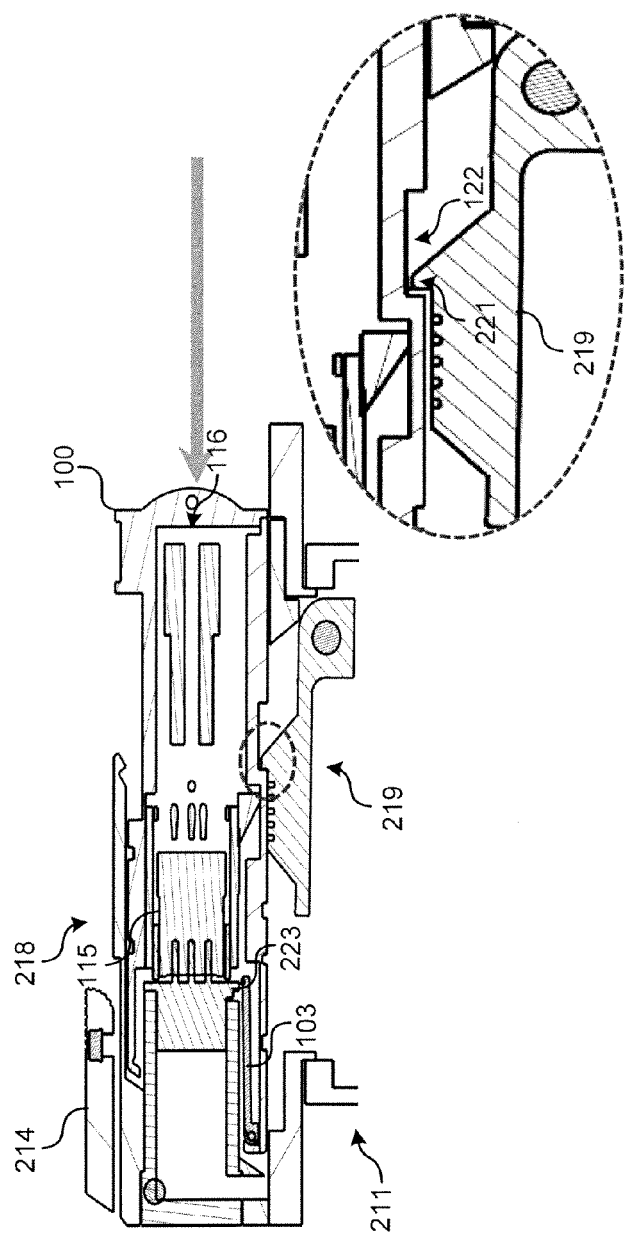

FIG. 6F illustrates an example of an RMU 100 fully installed into the bay 218. When the RMU 100 is fully inserted into bay 218, both doors 219 and 103 are fully open, and the plug 115 is fully seated in the receptacle 223, providing an electrical coupling for data transfer between electronics 116 and module 211. Additionally, the projection 221 is fully engaged with indentation 122. This provides a locking mechanism that locks the RMU in place until the eject lever 214 is pulled. The projection 221 further provides tactile feedback indicating to the user that the RMU 100 is fully installed. Furthermore, the engagement between projection 221 and latch 122 provides mechanical stability. This may be beneficial in vibration prone environments. Although the electromechanical connectors themselves have an intrinsic mechanical coupling force, they are not designed to hold the mass of an RMU, resulting in vibrational susceptibility. The latch maintains and secures the RMU in the connected state and provides an extra mechanical connection for the connectors, protecting further against vibration.

Figure 6G:
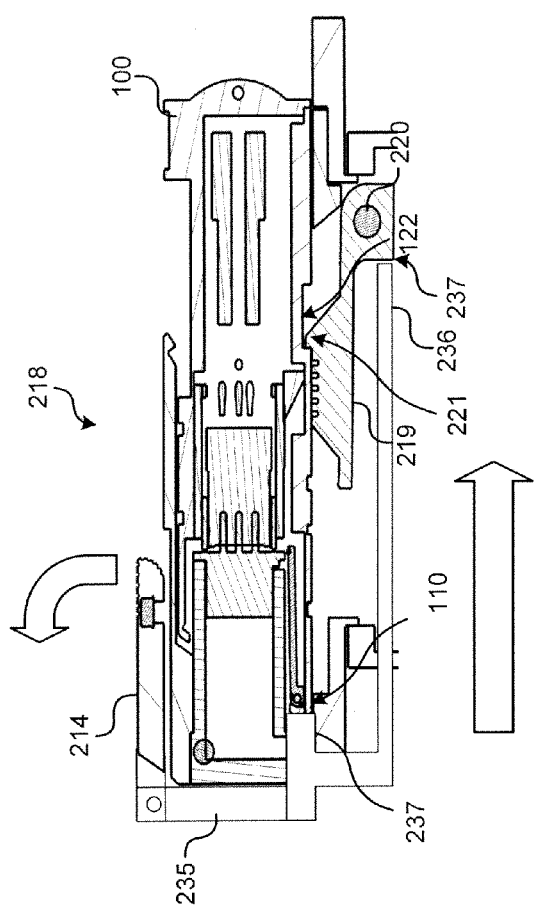

FIG. 6G illustrates an ejection lever implemented in accordance with an embodiment of the invention. In the illustrated embodiment, the lever 214 is connected to push rod 235, which has a projection 237 disposed to have an end near the final mating location of the nose portion 110 of the RMU 100. A second projection 236 is disposed to have an end near the portion 237 of the door 219 that extends below pivot point 220. As the hinge is pulled out and down, the projection 236 pushes door portion 237, causing door 219 to continue rotating about pivot point 220, such that toe wedge projection 221 is disengaged from indentation 122. Once the latching mechanism is disengaged, continued movement of lever 214 causes the projection 237 to contact nose portion 110, disengaging the electrical connection and partially ejecting the RMU 100 from the bay 218. Ejection is completed manually by removing the RMU 100 from the bay 218.

FIGS. 7A and 7B illustrate a receptacle that may be used in an RMU bay 218 in accordance with an embodiment of the invention. The receptacle 400 comprises a housing 401 having an aperture with a lip 205. Disposed beneath the lip is an O-ring 402. Within the aperture is a contact pad 404 comprising a plurality of pins 403. Pins 403 are spring loaded with compression springs within their bodies 409. When the pins 403 contact corresponding contact pads in the plug 500, the tips 208 of pins 403 are pushed into the pin bodies 409, forming a resilient and vibration resistant contact point.

FIGS. 8A and 8B illustrate a plug corresponding to the example receptacle 400. The plug comprises a body 505 having an aperture and a lip 502. In the plug, the lip 502 is directed outwardly, while the lip in the plug 405 is directed inwardly. However, in other embodiments, other complementary geometries may be employed. Underneath the lip 205 is a second O-ring 501. Within the aperture is a contact pad comprising a plurality of electrical traces 503.

When the plug 500 is engaged with the receptacle 400, the pins 403 engage the electrical traces 503. The pin tips 408 are pushed in by the contact, forming a resilient contact. The lip 503 slides within the lip 502 and underneath the O-ring 402. The O-ring 501 then engages with the O-ring 402, both maintaining the plug 500 in engagement with the receptacle 400 and providing an environmental seal protecting the electrical contact. The illustrated connector has a planar geometry, which shortens the long-axis of the RMU, allowing for a more compact form factor, which may be beneficial in space critical applications. In some embodiments, the O-rings 402 and 501 comprise any suitable elastomeric material, such as those described above.

Figure 9B:
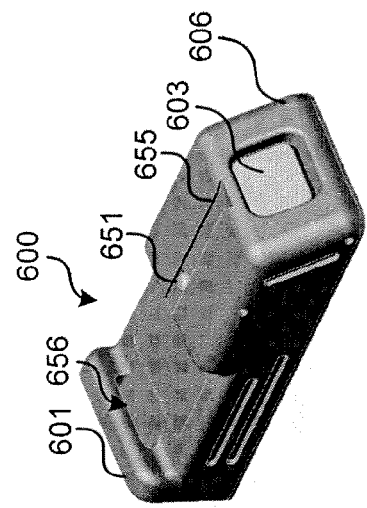
FIGS. 9A and 9B illustrate an alternative RMU implemented in accordance with an embodiment of the invention.
Figure 9A:
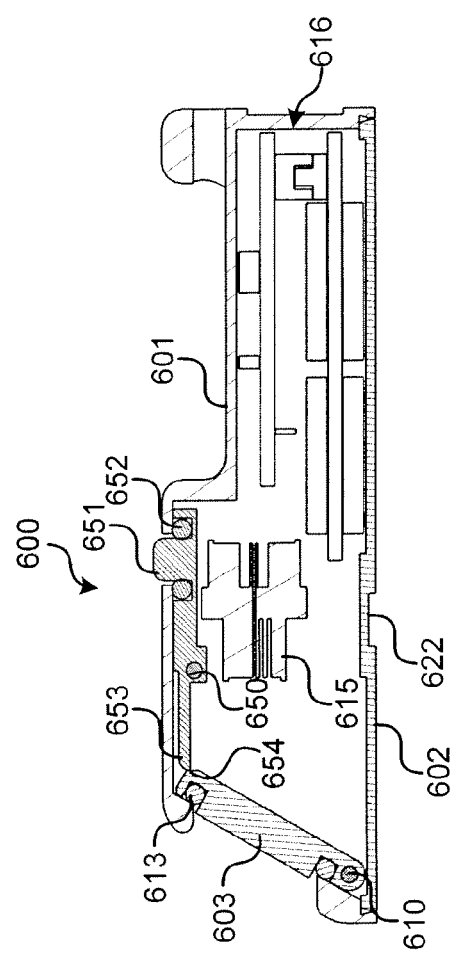

FIGS. 9A and 9B illustrate an alternative RMU implemented in accordance with an embodiment of the invention. The RMU 600 is similar to the RMU 100 described above, with the addition of a latching system 650-654. The RMU 600 comprises a housing 601 and a back panel 602. In other embodiment, the housing 601 and panel 602 may comprise one integral housing. The housing 601 comprises a front portion comprising planar surface 606 that is inclined with respect to the panel 602. The front 606 comprises a portal for a door 603. The door 603 is spring loaded to bias the door in the closed position using a spring. The housing 601 further comprises an indentation 622. In addition to improving grip during insertion and removal, the indentation 622 provides a location for a latching mechanism during insertion, as described above. The housing further comprises an aperture 602 allowing attachment of a tether to hold the RMU 600 while not installed in a bay.

The panel 602 is affixed to the housing 601 in a sealed manner, for example, using screws or other fastening mechanisms and an environmental seal. When in the closed position, the door 603 shuts the portal on the front panel 606, environmentally sealing the RMU 600. In some embodiments, an O-ring 613 is disposed between the portal and the door to complete the environmental seal. Within the RMU, an electromechanical connector plug 615 is disposed behind the door 603, at a sufficient distance to allow the door 603 to swing inward during insertion. In some embodiments, the plug 615 comprises any of a variety of commercial off the shelf (COTS) connectors, in other embodiments, the plug 615 may comprise a specialized connector, as described below. The connector 615 is coupled to and provides an interface to electronics 616. In the illustrated embodiment, the electronics 616 comprise memory electronics including a controller and storage media. In some embodiments, electronics 616 may comprise a printed circuit board (PCB) controller coupled to a storage media. The storage media may comprise flash memory, or any other suitable storage media, such as NVRAM.

RMU 900 further comprises a latching system 650-654. In a default state, the door 603 is closed and a latching member 653 maintains the door 603 closed by pressing on the upper edge 654 of the door 603. The latching system further comprises a button or projection 651 that is coupled to a latching member 653. Pressing the button 651 causes the latching member 653 to pivot about pivot point 650, which causes the latching member 653 to disengage with the surface 654, allowing the door to swing inward. The spring bias of the door 603 causes the door 603 to reengage with the latch 653 after removal of the RMU 600 from the RMU bay. A seal 652, such as an elastomeric gasket maintains an environmental seal where the projection 651 passes through the housing 601. In the illustrated embodiment, the exterior housing 601 of the RMU comprises a key way 655, allowing the projection 651 to be depressed or in line with the outer surface of the housing. This assists in preventing the button from being accidentally depressed when the RMU 600 is outside of an RMU bay. The corresponding RMU bay is provided with a corresponding projection to depress the projection 651 while the RMU 600 is being inserted, allowing the door 603 to open only at the appropriate time.

Figure 10:
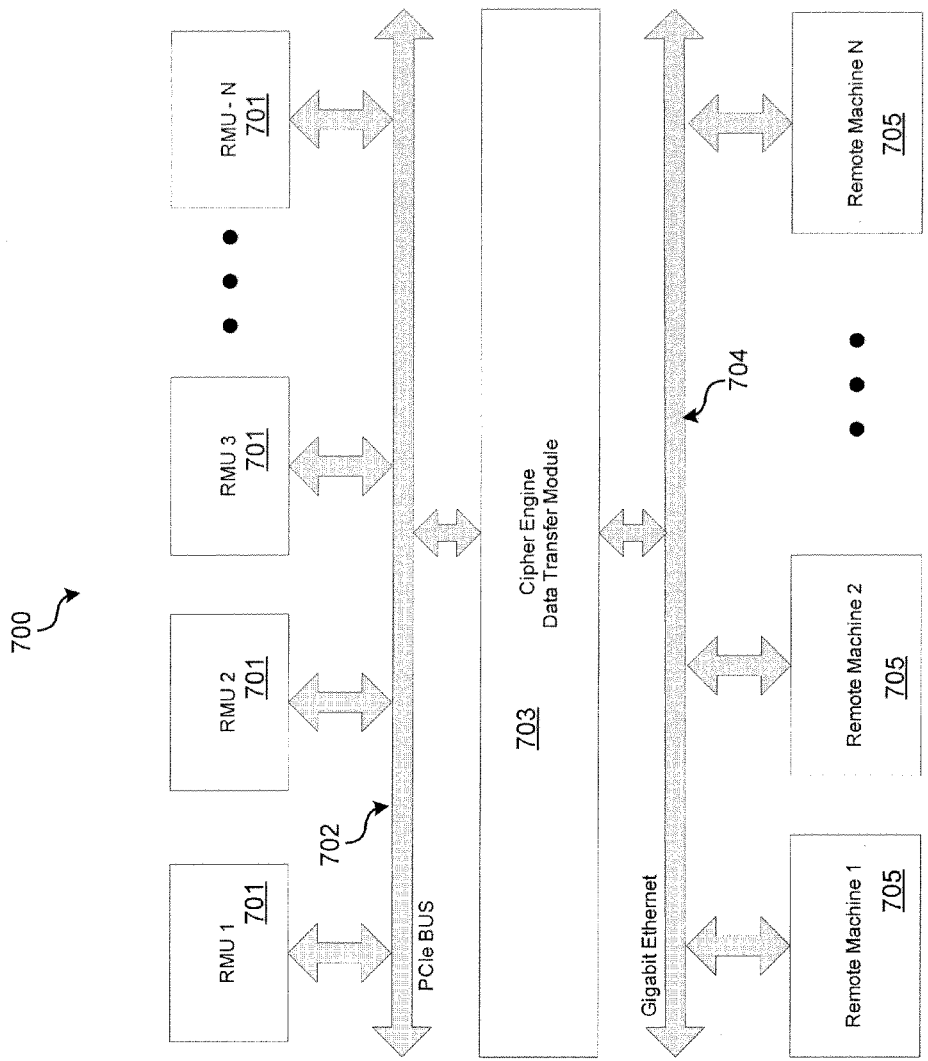
FIG. 10 illustrates a system architecture for an RMU data loader implemented in accordance with an embodiment of the invention.

FIG. 10 illustrates an example system architecture for an RMU data loader implemented in accordance with an embodiment of the invention. In this embodiment, the RMU bays are coupled to a controller 703 via a bus 702. For example, the bus 702 may comprise a PCIe bus. The controller 703 comprises a transfer module and cryptographic module. The controller 703 is further coupled to a plurality of remote machines 705 via a second bus 704. For example, the second bus may comprise a Gigabit Ethernet bus. The illustrated architecture is based on Secure Open Software Architecture (SOSA) that it can be configured without changing/modifying the electronic hardware for different functionality. The system provides flexibility by utilizing SOSA-based software with generic hardware configuration, e.g. Removable Memory Unit (RMU) 700 can be formatted and specific volume-labeled so that the RMU can be installed in any slot.

In some embodiments, various methodologies may provide for different treatment of differing data types. For example, some embodiments provide different circuitry for differing treatment of sensitive and non-sensitive data. One example of sensitive data and non-sensitive data is RED data and BLACK data, respectively. Other examples include unencrypted (plaintext) data for which protection is desired, and unencrypted data for which protection is not desired, respectively; or unencrypted (plaintext) data and encrypted (ciphertext) data, respectively. In this description, although references are made to RED and BLACK data, the described embodiments may be applied to any type of sensitive or non-sensitive data or any other alternative data treatment. The system builds virtual data paths in a soft-wired manner. Security of the system is provided by the flexible and expandable security architecture, which has no dependency to the data types, i.e. encrypted, unencrypted, BLACK, or RED. These data types can coexist in a system without changing the configuration by creating virtual data paths for each data type or for particular combined data types, e.g. sensitive RED or non-sensitive BLACK.

The system comprises a plurality of RMUs 701, and a cipher engine and data transfer module 703. RMUs can be installed in any installation location. The RMUs 701 are equipped with RMU volume labels that determine the data path and security requirements. The cipher engine 703 decrypts/encrypts the data if necessary. For example, the cipher engine 703 may employ NIST approved encryption algorithms (e.g., as applicable to FIPS 140-2) such as the NIST-approved Advanced Encryption Standard (AES). The data transfer module 703 processes the volume data in response to command from remote machines 705 for data transfer through high speed communication interfaces 704, such as Gigabit Ethernet, High Speed Interface, or Fiber Channel. In some embodiments, remote machines 705 may comprise avionics systems mission computers, display computers, air data computers, data recorders, general storage devices, maintenance computers, logistics computers, health monitoring systems, navigations systems, control systems, or other avionics systems. The remote machines 705 may also comprise other data systems, such as data systems for ground vehicles or ground stations.

The system 700 routes data based on the data types so that the remote machines 705 do not rely on the physical location of the data. Utilizing buses 702 and 704 (or a form of high speed data interface with communication protocols) as communication channels provide high flexibility and builds the data network between RMUs 701 and cipher engine/data transfer module 703 and between data transfer module 703 and remote machines 705.

Figure 11:
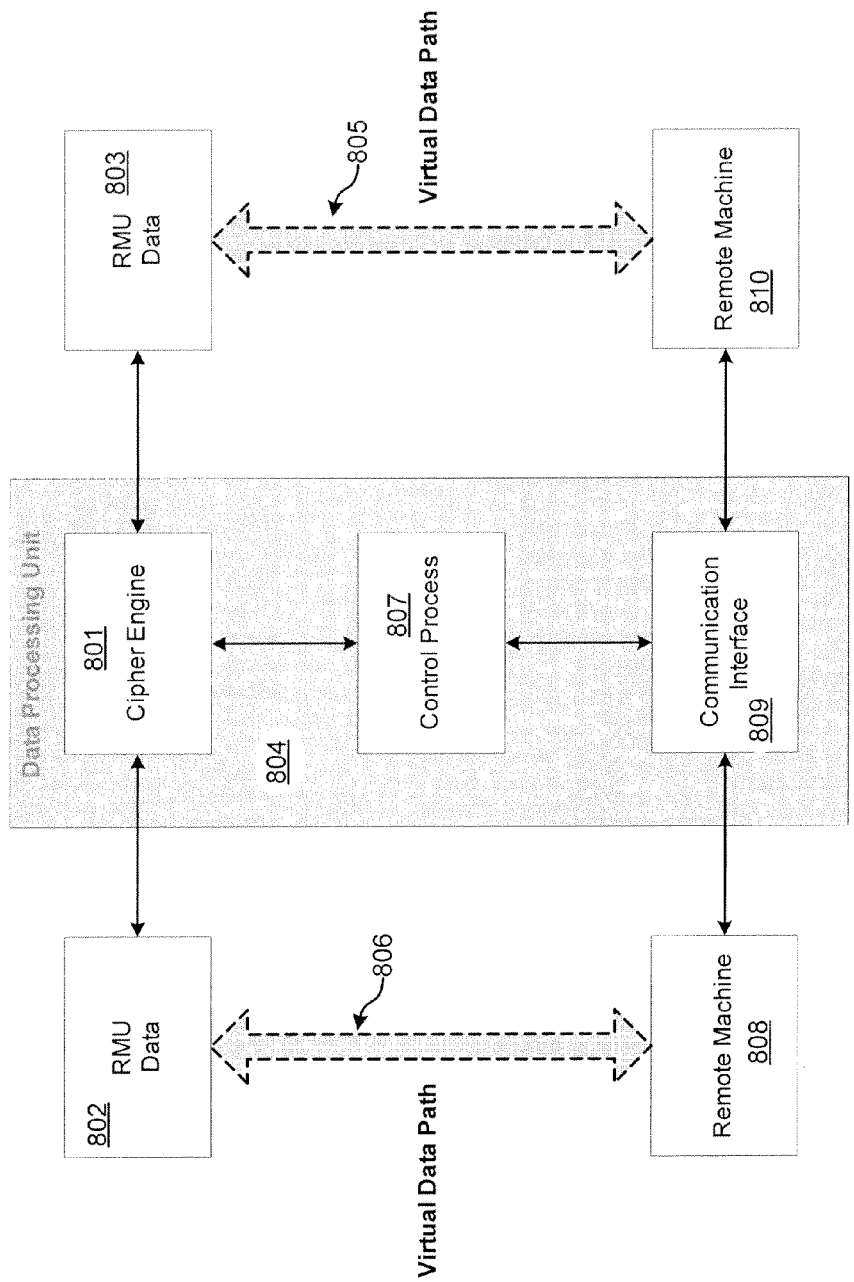
FIG. 11 illustrates system architecture for the creation of virtual data paths for routing of data to and from RMUs and corresponding remote machines.

FIG. 11 illustrates an example system architecture for creating virtual data paths for routing data between RMUs and corresponding remote machines. In the illustrated embodiment, the system software is implemented using Secure Open Software Architecture but provides security as needed. The RMU 802 data type determines the need of encryption and the system 804 routes the data path 806 depending on the data types so that secured or unsecured data can coexist in one system. Single or multiple remote machines 808 may request the data, unencrypted (plaintext) or encrypted data (ciphertext). Data is transferred through different virtual data path 806 on request based on the data types or RMUs 802 and command from the remote machines 808. In the illustrated embodiments, there are four possibilities in these data paths: 1) unencrypted RFD data path; 2) encrypted BLACK data path; 3) encrypted RED data path; and 4) unencrypted BLACK data path. In other embodiments, other data paths may be defined according to system implementation and system environment. Typically, RED data is unencrypted protected information but may require encryption over the transmission line and BLACK data is encrypted or un-protected information but may require decryption over the transmission line.

In the illustrated embodiment, the data processing unit 804 may be configured to implement the functionality of module 703 described with respect to FIG. 7. The unit is configured to establish virtual data paths 806 and 805 between particular RMUs 802 and 803 and remote machines 808 and 810, respectively. The virtual data paths are configured to handle different data types differently, so that the RMU's physical location and the physical path between the RMU 802 or 803 and remote machine 808 or 810 is transparent to the remote machines 808 or 810. The unit 804 comprises a cipher engine 801, a process control module 807 and a communications interface 809. The cipher engine 801 encrypts or decrypts data from RMUs 802 as needed according to the RMUs' 808 or 803 data type. The communications interface 808 delivers the data to remote machines 808 and 810, and receives data to be stored in the RMU. The process controller 807 controls the communications interface 809 and cipher engine 801 according to commands received from remote machines 808 or 810.

Figure 12:
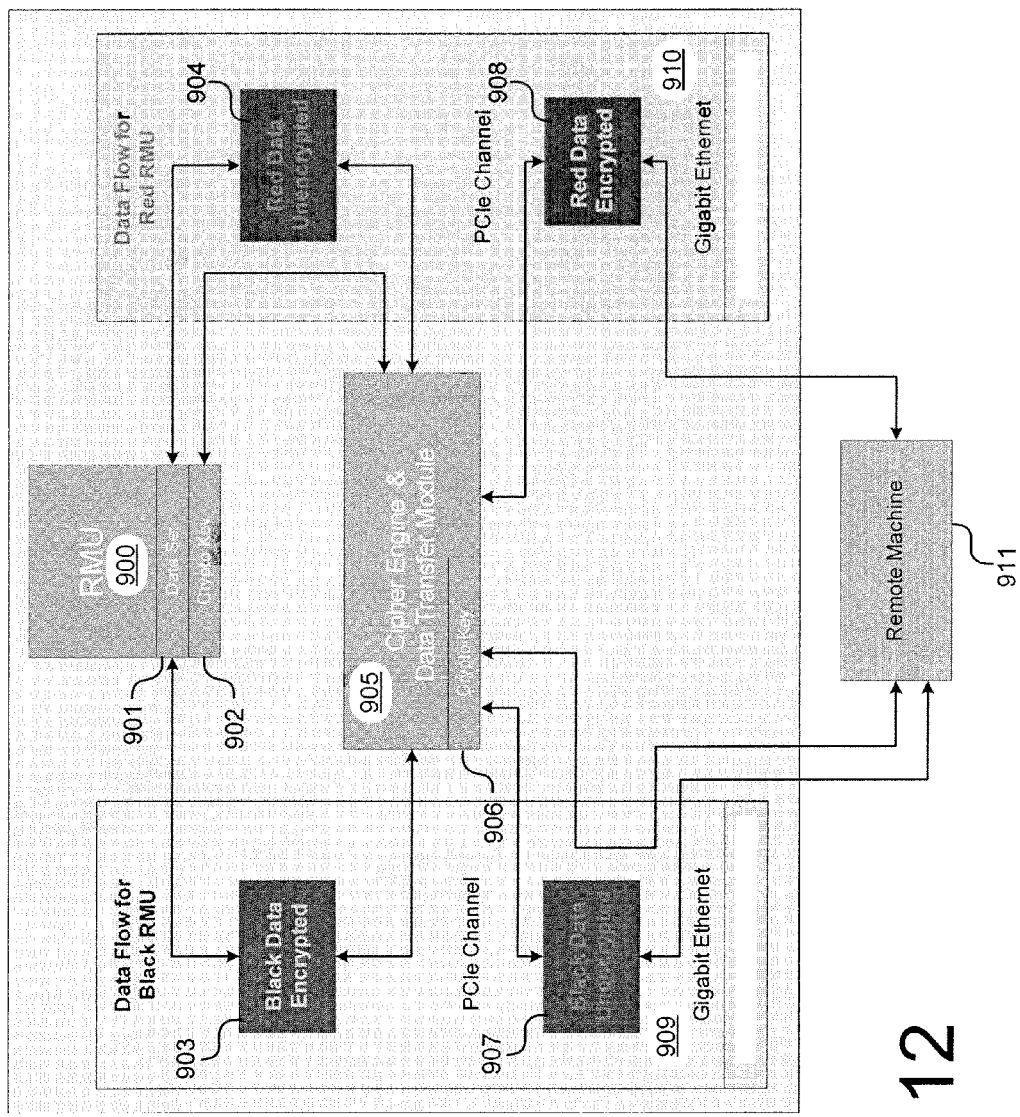
FIG. 12 illustrates data flows for RED and BLACK data according to an embodiment of the invention.

FIG. 12 illustrates data flows for RED and BLACK data according to an embodiment of the invention. In this embodiment, an RMU 900 stores data 901 and, in some cases, a cryptographic key. In some embodiments, when the RMU 900 is initially connected to the cipher engine and data transfer module 905, the module 905 may perform an authentication procedure with the RMU 900. For example, the module 905 and RMU 900 may perform various cryptographic protocols utilized to perform entity authentication. In one data flow, encrypted, BLACK data 903 is transferred to the module 905, for example through a PCIe channel. The BLACK data may be unencrypted by cipher engine 905 to form unencrypted BLACK data 907 and securely sent to the remote machine 911 over gigabit Ethernet 909. For RED data, unencrypted RED data 904 may be transferred from RMU 900 to module 905, and then encrypted by cipher engine 905 for transmission to remote machine as encrypted RED data 908 over Gigabit Ethernet 910 to remote machine 911.

Figure 13:
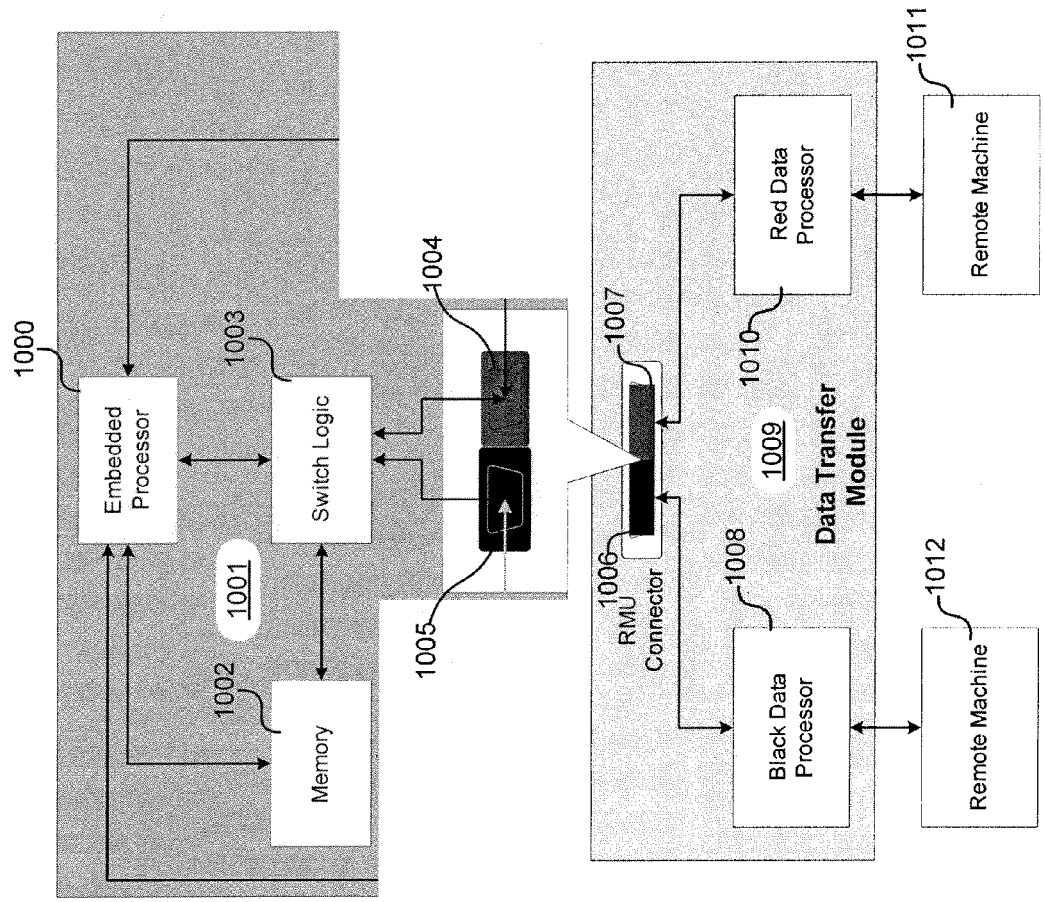
FIG. 13 illustrates a system implementing separate physical paths for RED and BLACK data.

In some implementations, such as those meeting TEMPEST or NSA requirement, separate physical paths are provided to prevent contamination between RED and BLACK data. FIG. 13 illustrates a system implementing separate physical paths for RED and BLACK data. In one embodiment, the data transfer module 1009 is equipped with separate physical circuitry for the different data types. A BLACK data connector 1006 is coupled to a BLACK data processor 1008. The BLACK data processor 1008 is further coupled to a remote machine 1012. Likewise a RED data connector 1007 is coupled to a RED data processor 1010. Red data processor 1010 be coupled to another remote machine 1011. In this embodiment, the RMU 1001 is equipped with two physical connectors, 1005 and 1004 as well. The RMU 1001 further comprises an embedded processor 1001 coupled to switch logic 1003 and a memory 1002. In the illustrated embodiment, the embedded processor 1000 maintains the switch logic to couple the memory 1002 to the correct physical port 1004 or 1005 according to the RMU's 1001 data type. In other embodiments, the physical switch may be manually, or electrically controlled by a user or ground station, to set a specific RMU 1001 to operate in a RED environment or BLACK environment.

The illustrated RMU 1001 physically separates the data paths and using one memory device 1002 with two internal connectors 1005 and 1004 for RED and BLACK data types, respectively. Therefore BLACK RMU and RED RMU can have different physical data path in data transfer module 1009. When the RMU 1001 is programmed or loaded with data, for example at a ground station, the data type will be defined and then the data path will be designated as either BLACK or RED. The switch logic 1003 in the RMU 1001 routes the data to either internal BLACK connector 1005 or RED connector 1004 so that when the RMU 1001 is installed in the data transfer module 1009, the data can be routed correctly through physically separated data processing and transfer processors 1008 and 1010. In this configuration, the RED data processor 1010 and the BLACK data processor 1008 are independent and physically separated, with two electronic circuits. This reduces the logistics burden and reduces the maintenance overhead by using one RMU 1001 for all data loading processes. Protected and un-protected data maintenance and management may be defined in the ground station instead of using two separate RMUs. This can further reduces the required number of units in some implementations.

Figure 14:
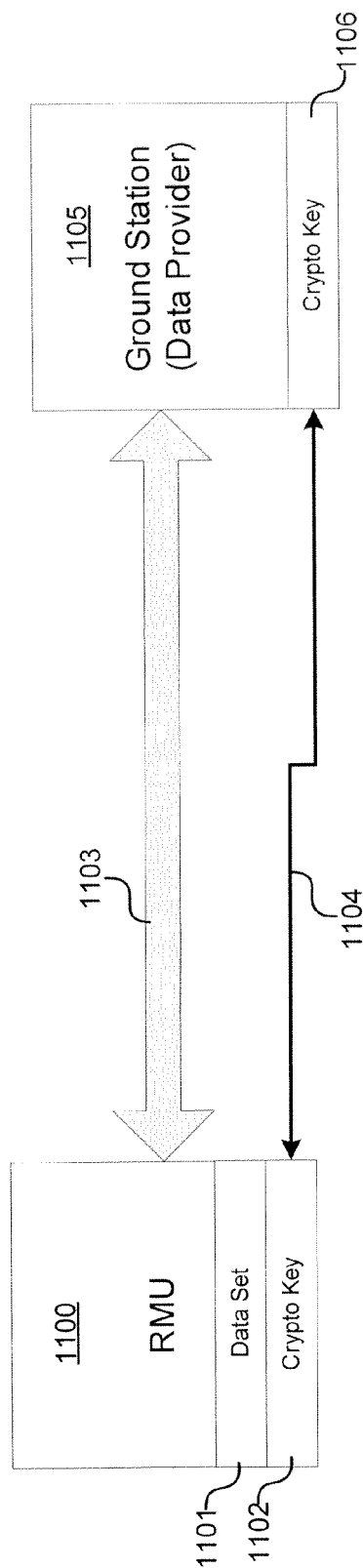
FIG. 14 illustrates a system for preloading data onto an RMU.

In various embodiments and implementations, an RMU is pre-loaded with data for use by particular remote machines. FIG. 14 illustrates a system for preloading data onto an RMU in accordance with one embodiment of the invention. In one embodiment, this pre-loading is performed by a ground station or other data provider 1105. In the illustrated embodiments, the RMU 1100 is connected through a data cable 1103 to transfer/receive the data 1101 from/to the ground station system 1105. In some embodiments, because the ground station 1105 is not in a harsh environment, the interface may be performed by inserting a data cable 1103 through the door to the RMU (for example, door 103 of FIG. 1). In this embodiment, RMU 1100 has a dedicated partition 1102 to store the crypto key if it is needed. Ground station 1105 manages 1104 the crypto key 1106 that may be updated or altered based on the key management scheme implemented. In various embodiments, the system may utilize both symmetric and asymmetric FIPS 140-2 compliant cryptographic algorithms. These algorithms can be utilized independently or in combination, providing flexible accommodation of required key loading methods.

In a particular embodiment, plaintext loading methods can be supported. Plaintext key loading is a method of establishing keys in the system. Plaintext keys can be transferred 1104 from the ground station system 1105 to the data loading system using the RMU 1100. Alternatively, plaintext keys 1102 can be loaded over the Ethernet interface from the MC. Plaintext key loading 1102 does not provide any security over the key material in transit (prior to being loaded into the system). However, plaintext keys can be used to establish a shared symmetric key-loading-key operation, which could from then on be used to securely exchange/load encrypted keys.

In another embodiment, the use of public key (asymmetric) cryptography can be utilized to securely load and reload keys into the system. Use of public keys involves the data loading system internally creating a public-private key pair, and exporting the public key to an external entity (RMU 1100 or ground station 1105). The key(s) to be loaded into the system would require encryption (by ground station 1105) under the previously exported public key. Public keys can be utilized to load any type of key, whether it is a shared symmetric key-loading key(s) (for future symmetric key loading), or the symmetric key-encryption key(s). In this embodiment, while the task of generating the asymmetric key pair occurs on the system, the management and association of each public key occurs on the ground station 1105.

Figure 15:
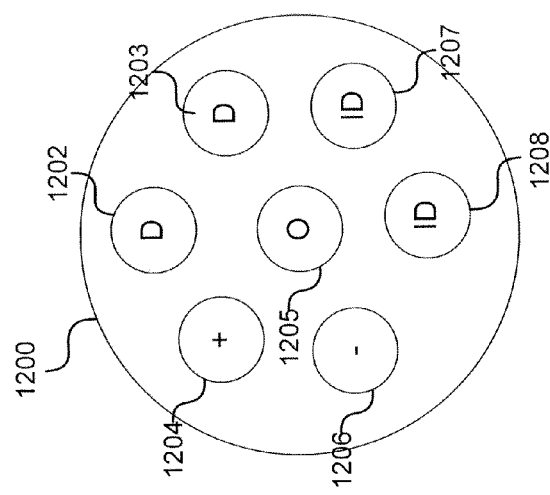
FIG. 15 illustrates the pins of an RMU connector implemented in accordance with an embodiment of the invention.

In some embodiments, volume labels, such as those commonly employed in removable media, may be used to identify the contents of particular RMUs. Additionally, in some embodiments, separate channels may be provided for RMU identification. FIG. 15 illustrates the pins of an RMU connector 1200 implemented in accordance with an embodiment of the invention. For example, the pins may be implemented in a snap style connector as illustrated in FIGS. 7A-8B, or may be implemented in other standard connector styles. The connector 1200 comprises one or more data pins 1202 and 1203, for data exchange with a data transfer module to a remote machine. For example, the RMU may employ a serial communication protocol, such as a packet based serial protocol like USB. The connector 1200 may further comprise a VCC pin 1204 and ground pin 1206 for power supply to the RMU. The connector 1200 may further comprise one or more identification pins 1207 and 1208. These pins may be configured to provide an identification channel for RMU volume identification. For example, in one embodiment each ID pin 1207, 1208 may be configured to provide a high or low DC signal. One of the signals is predetermined to correspond to digital 1, the other digital 0. Accordingly, the channel can send a binary pair to allow the identification of the RMU from one of four possible RMU types. For an increased number of RMU types, the number of ID pins may be increased. The connector may further comprise a fiber optic connector 1205 for an optical authentication system, as described below.

Figure 16:
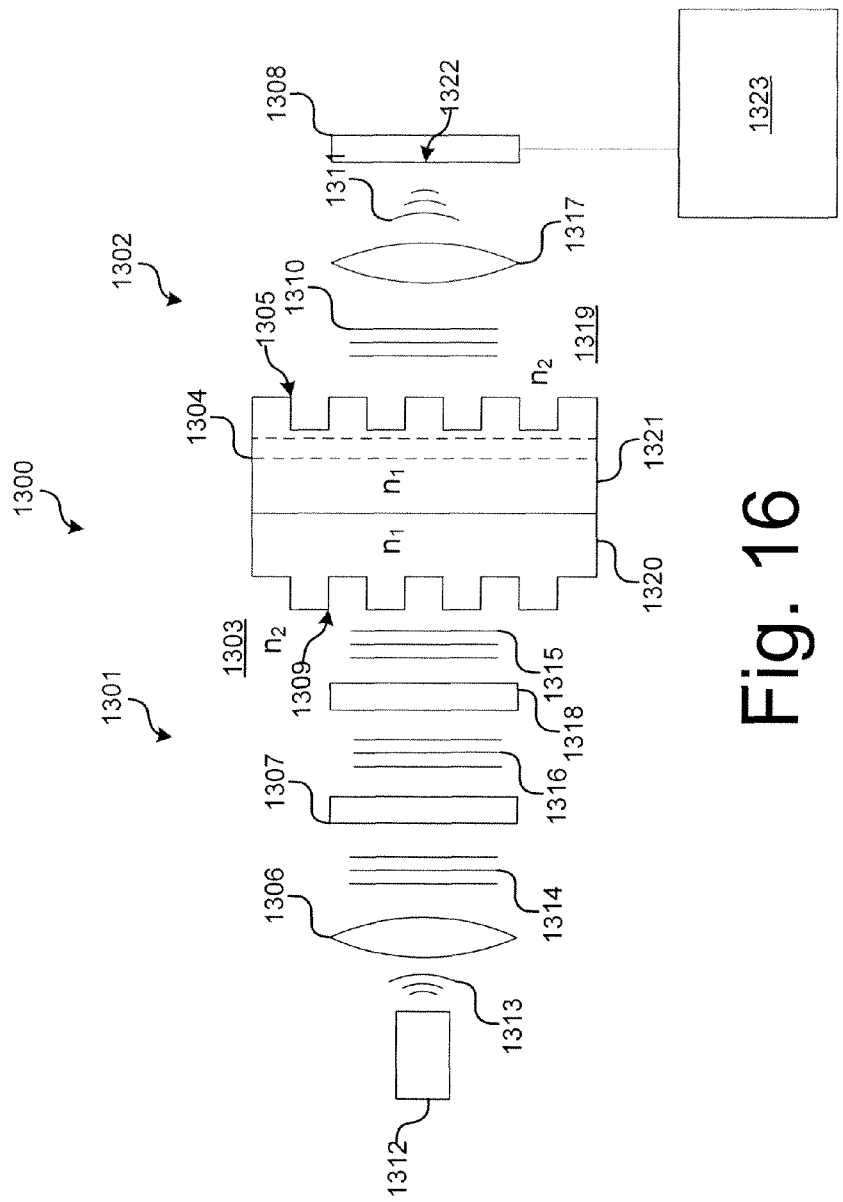
FIG. 16 illustrates an optical authentication system implemented in accordance with an embodiment of the invention.

In one embodiment, the optical authentication system utilizes the Talbot Effect to determine if a periodic structure disposed on an RMU matches a periodic structure dispose on a data transfer module. FIG. 16 illustrates an optical authentication system implemented in accordance with an embodiment of the invention. In this embodiment, the male side 1301 of the au on system is disposed in the RMU, for example in the connector of the RMU. A laser 1312 or other light source emits a diverging light beam 1313. Preferably, the light beam 1313 is nearly monochromatic, for reasons discussed below. A collimating lens 1306 collimates beam 1313 to produce a plane wave beam 1314. In one embodiment, the collimating lens 1306 comprise a gradient index (GRIN) lens disposed in an optical fiber. In some embodiments, the polarization of the light has an effect on its propagation through the authentication system. In these embodiments, a polarizer 1307, such as an in-fiber linear polarizer, polarizes the light to produce a planar polarized light beam 1316 to reduce these effects. In embodiments where the light source 1312 is not sufficiently monochromatic, a falter 1318 further filters the light to produce a monochromatic, polarized, planar light beam 1315. In a particular embodiment, the filter 1318 comprises an interference, or dichroic filter, having a narrow pass band. The beam 1315 propagates through the medium 1303, having an index of refraction $n_2$, for example the core of an optical fiber. Disposed at the end of the medium 1301 is a periodic interface 1309 with a second medium 1320 having a second index of refraction $n_1$. Due to the Talbot Effect, a replica image of the interface is formed at regular distances away from the interface 1039. This distance is known as the Talbot Distance, and may be referred to herein as $Z_T$. At another distance, the light is 180° out of phase with the imaged interface 1309. In the illustrated embodiment, the male portion 1301 of the optical authentication system comprises a volume 1320 of medium $n_1$, having a thickness 1320. The female portion 1302 of the authentication system comprise a second volume 1321 of the medium $n_1$, having a thickness 1321. In the illustrated embodiment, the thickness 1320 plus 1321 is configured to differ from the Talbot Distance by a distance 1304 sufficient to induce a 180° phase shift in the image of the structure 1309. At this distance, a copy 1305 of the structure 1309 is located, and forms the exit from the material 1321, into the medium 1319, having an index of refraction, $n_2$, equal to the index of medium 1303. For example, the medium 1319 may be the core of an optical fiber similar to the one used in the male portion 1301.

If the structures 1309 and 1305 match, then the light emitted 1310 from the authentication structures will be substantially planar. A converging lens 1317, such as a second GRIN lens, will focus the plane wave 1310 to form a converging beam 1311, having a substantially point-like focus 1322. An image sensor 1308, such as a CCD or CMOS sensor, is located at the focal plane of lens 1317. The image sensor 1308 measures the focal point 1322. An evaluation module 1323, compares the focused image to a threshold to determine if the structures 1309 and 1305 match, and therefore if the RMU having male portion 1301 is authentic.

If the structure 1309 and 1305 do not match, then the light 1310 emitted from the authentication structures will not be planar. Accordingly, the spot imaged by the lens 1317 will be spread out. The image sensor 1322 and evaluation module 1323 detect the spread nature of the spot, for example, by thresholding. The evaluation module 1323 may then transmit an indication that the RMU having male portion 1301 is not authentic.

Figure 17:
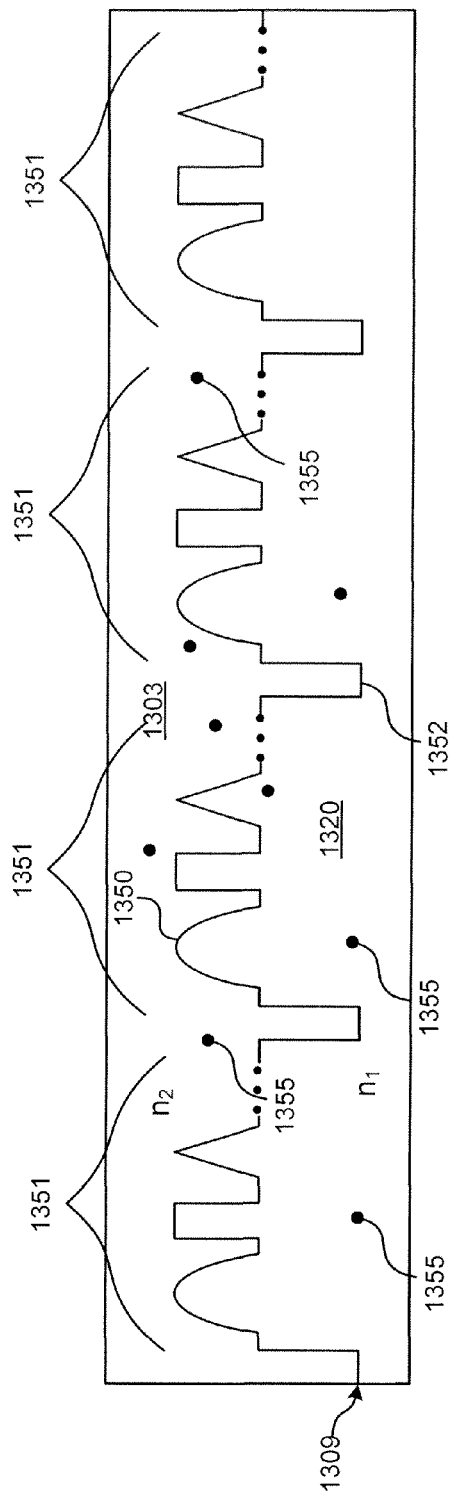
FIG. 17 illustrates a close-up view of a portion of an authentication structure, showing the micron scale features, implemented in accordance with an embodiment of the invention.

In some embodiments, the authentication structure 1309 comprises a boundary between two media having different indexes of refraction. Although the boundary is illustrated as regular flat surfaces, in practice, the boundary may have micron scale features that are unique to particular RMUs or RMU classes. FIG. 17 illustrates a close-up view of a portion of an authentication structure, showing the micron scale features. In this embodiment, a plurality of shapes 160, such as arcs, triangles, rectangles, or other shapes, are etched into the boundary between medium 1303 and 1320. The shapes combine to form sets of shapes 1351, which are repeated at regular intervals along the boundary of medium 1303 and 1320. In some embodiments, fiducial markings 1352 are also included between shape groups 1351. For example, in a particular embodiment, the boundary structure 1309 is formed by a photo-lithographic process, employing a step and repeat process. In this embodiment, the fiducial markings 1352 may be used for alignment assistance and ensuring a regular distance between shape groups 1351.

In other embodiments, instead of groups of shapes 1351, other structures may be employed. For example, a predetermined diffuser, such as a non-Lambertian diffuser, or microprism array may be repeated along the length of the boundary 1309 to form the periodic authentication structure. Such a repeating diffuser may be manufactured using a step and repeat embossing procedure using a diffuser master, such as a diffuser master made in accordance with U.S. Pat. No. 6,241, 903, which hereby incorporated by reference in its entirety.

In a further embodiment, a plurality of hard nanoparticles 1355 are embedded in media 1303 and 1320. These hard nanoparticles 1355 are sized significantly smaller than the wavelength of the light to be used in the authentication system, for example, on the order of 1 to 10 nm so they do not interfere with the operation of the authentication system. The nanoparticles 1355 prevent copying of a captured RMU by interfering with scanning machines, such as scanning electron microscopes or focused ion beam instruments. When the focused ion beam hits a nanoparticle 1355, it is unable to remove the particle without turning up the power, destroying the surrounding structure. In some embodiments, the hard nanoparticles 1355 may comprise carbides, tungsten carbides, tungsten particles, diamonds, niobium particles, niobium carbides, or similar hard particles.

Figure 18:
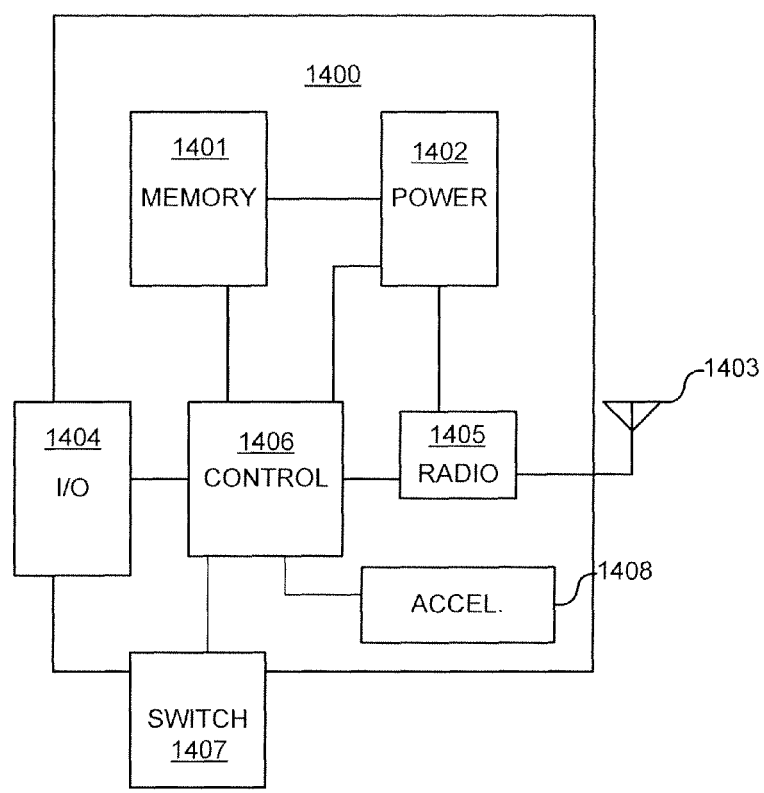
FIG. 18 illustrates an RMU control system for erasure of memory contents stored on the RMU implemented in accordance with an embodiment of the invention.

As discussed above, in some embodiments an RMU has the ability to zeroize, or clear its memory contents on command. FIG. 18 illustrates one such embodiment of the invention. Here, the RMU 1400 comprises a controller 1406 coupled to a memory 1401, a power source 1402, an interface 1404, and in some embodiments a radio 1405 or a switch 1407. In one embodiment, the controller 1406 is configure to wipe the memory 1401 upon a command received from an authenticated RMU data transfer module received via interface 104. In another embodiment, the controller 1406, and RMU 1400 as a whole, receives its main operating power through interface 1404. If the power is interrupted, the controller 1406 is configured to switch to auxiliary power 1402. If the power from interface 1404 is interrupted for a sufficiently long period of time, then the controller 1406 activates the memory erasure. In some embodiments, the RMU 1400 receives power through interface 1404 from the essential bus of an aircraft. If the power interrupted for more than a few seconds, for example 10 s, the controller 1406 automatically wipes the memory 1401.

If the memory 1401 is volatile, the wiping procedure may comprise disconnecting the memory 1401 from the power supply 1402 and shorting any contacts to remove residual charge. If the memory 104 is non-volatile, the wiping procedure may comprise writing over the memory 1401 with all 1's or 0's or some other predetermined pattern. In some embodiments, memory 1401 comprises a pyrotechnic ignitable film disposed on the memory elements. In these embodiments, wiping the memory may comprise igniting the film.

In further embodiments, the RMU 1400 comprises systems for enabling the memory 1401 to be erased when disconnected from an RMU transfer module. In one embodiment, a switch 1407 is disposed on the outside of the RMU housing. When a user manually switches the switch 1407, the controller erases the memory 1401 as discussed above. In an embodiment where the memory 1401 is wiped through the ignition of a pyrotechnic ignitable film, then the switch 1407 may be connected to a piezoelectric crystal instead of controller 1406. The switch 1407 strikes the crystal, generating a spark, which ignites the film.

In another embodiment, the RMU 1400 comprises a radio subsystem 1405 and an antenna 1403. For example, the radio subsystem 1405 and antenna 1403 may comprise an RFID tag, a wi-ti, or a cellular communications module. In this embodiment, the radio system 1405 receives regular signals indicating that the memory 1401 should continue to be preserved. In some embodiments, the regular signals may comprise authentication codes, for example generated by a pseudorandom number generator, with the RMU 1400 and signal generator sharing an initial seed. If these signals cease, the controller 1406 is configured to cause the memory 1401 to be erased. For example, the RMU 1400 may be configured to maintain its memory only while in proximity to a predetermined location or aircraft through radio system 1405.

In addition to receiving maintenance signals, using radio 1405, the controller may be configured to receive erasure commands through the radio 1405. For example, the RMU 1400 may be able to receive erasure signals from a ground station, so that users at the ground station can decide to erase the memory remotely. In some embodiments, it may require multiple or combined signals to initiate erasure of memory 1401. For example, the RMU 1400 may respond to control signals sent through a dual control split knowledge procedure that requires more than one user to activate the memory erasure procedure.

In a still further embodiment, the RMU 1400 may comprise an accelerometer 1408 or other sensor capable of registering a shock or a crash. In some embodiments, the RMU 1400 may be employed as a data storage on sensitive equipment, such as a manned or unmanned aircraft, and data on the RMU 1400 may be preferably erased in the event of a crash. In these embodiments, the accelerometer 1408 is configured to register shocks of greater than a predetermined amount, for example 20 g. Alternatively, the sensor may comprise a thermometer, and register a crash or other catastrophic even by measuring a temperature over a predetermined threshold.

Figure 19:
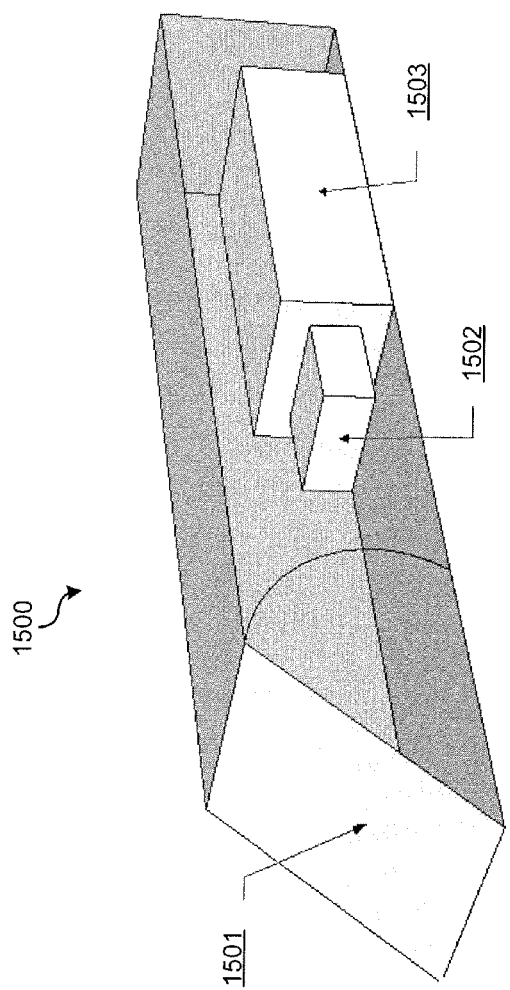
FIG. 19 illustrates an RMU having a secure housing for containment of an anti-tampering system implemented in accordance with an embodiment of the invention.

In further embodiments of the invention, various systems may be provided to increase Information Assurance (IA) for the RMUs by incorporating anti-tamper mechanisms into the RMU module. The anti-tampering mechanisms may provide a methodology to securely erase the RMU memory without rendering the device non-functional in the event of a physical breach. FIG. 19 illustrates an embodiment of the invention providing an internally secure area for implementation of an anti-tampering mechanism. In this embodiment, RMU 1500 comprises a housing having a front with a door 1501. Disposed within the housing is a computer storage medium controller electronics coupled to a connector 1502. The computer storage medium and controller are disposed within a second housing 1503 contained within the RMU housing. In general, a static (or deterministic) condition will persist internally inside the RMU, and particularly within the second housing 1503. As illustrated, even when door 1501 is opened to access connector 1502, the static or deterministic condition within the second housing 1503 is not changed. Any breach into the RMU 1500's second housing 1503 containing the internal memory integrated module(s) will alter the pre-existing condition, triggering the internal secure erasure circuit, resulting in the secure erasure of all the internal RMU memory. The internal memory is sealed in its own internally secure area 1503, with a barrier existing, between it and the RMU connector 1502. The anti-tamper mechanisms will prevent unmitigated penetration into the internally secure area.

Figure 20:
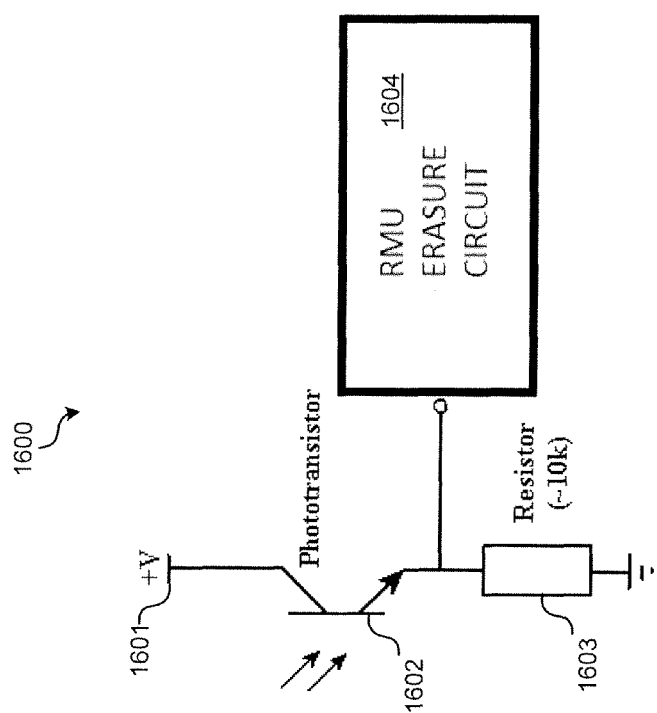
FIG. 20 illustrates an RMU anti-tampering system utilizing a phototransistor implemented in accordance with an embodiment of the invention.

Various systems may be employed to monitor the static conditions within the housing 503. FIG. 20 illustrates one such system implemented in accordance with an embodiment of the invention. Anti-tamper system 600 comprises a broad spectrum phototransistor 1602 disposed within the housing 1503. The circuit comprises a voltage source 1601 coupled to the collector of transistor 1602, a resistor 1603 and RMU erasure circuit 1604 are coupled in parallel to the emitter of the transistor 1602. If light reaches the base-collector junction of transistor 1602, corresponding to a breach in housing 1503, the RMU erasure circuit 1604 activates erasure, such as zeroization as discussed with respect to FIG. 18, of the RMU's memory.

Figure 21:
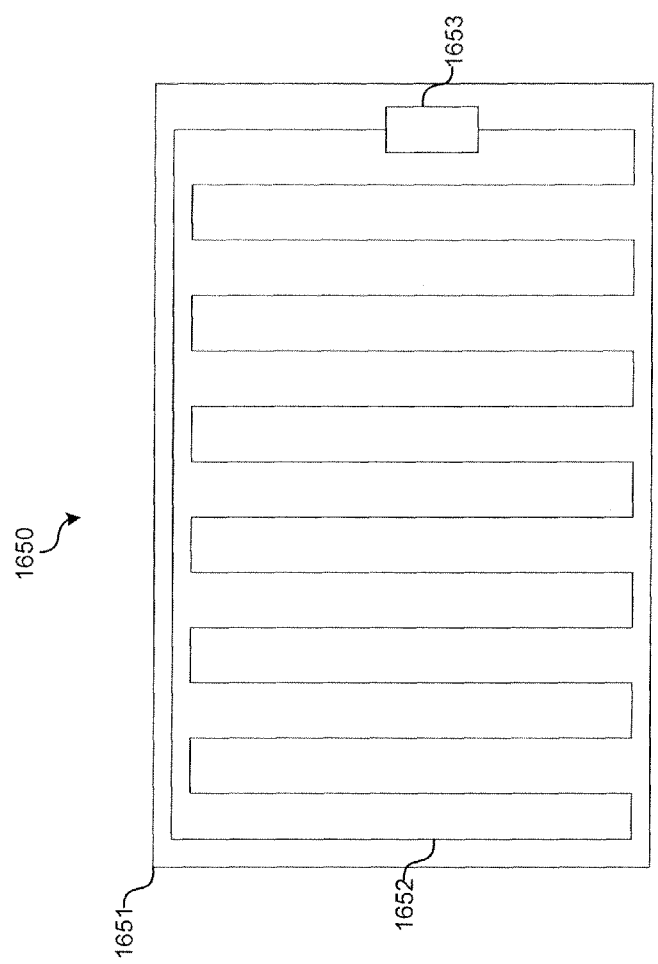
FIG. 21 illustrates an RMU anti-tampering system utilizing a serpentine electrical circuit implemented in accordance with an embodiment of the invention.

FIG. 21 illustrates another anti-tamper system implemented in accordance with an embodiment of the invention. In this embodiment, another anti-tamper measure is to use an active signal interleaved with its compliment (e.g. Vcc, Gnd), to physically surround the internal secure enclosure 1651. The circuit comprises a serpentine pattern 1652 on the inside of the secure enclosure 1651. This prevents direct confirmation of its existence by a potential threat, as well as the prevention of the determination of its functionality and unmitigated accessibility to bypass it. Module 1653 monitors one of the two signals, which is used to trigger the active erasure circuit. The compliment signal provides increased robustness, as any attempt to penetrate the secure area will either result in the discontinuity of the active signal (break the trace), or short the active signal to its compliment, both of which will trigger the active secure erasure circuit. In still further embodiments, pressure sensitive switches may be utilized. The switches normally remain closed. Any relief of the pressure (e.g. an attempt to open the RMU casing) will trigger the erasure circuitry.

Figure 22:
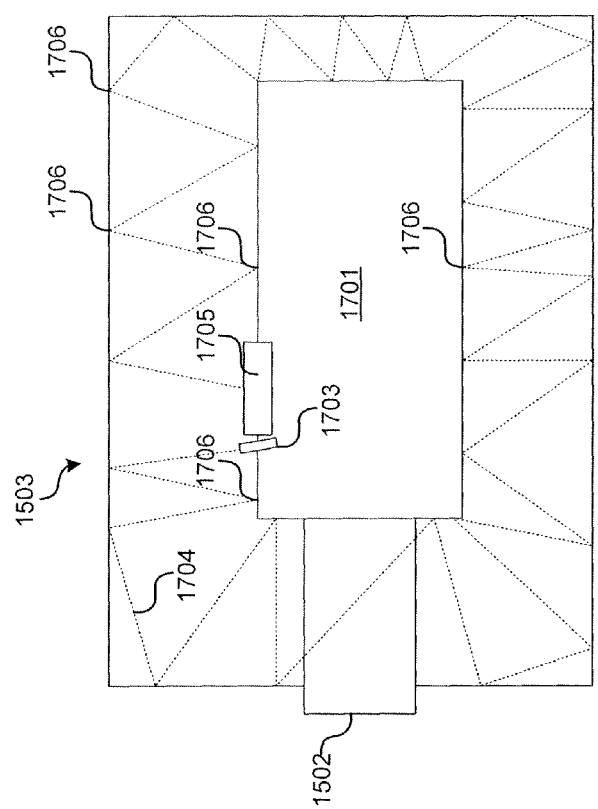
FIG. 22 illustrates an RMU anti-tampering system utilizing an optical beam implemented in accordance with an embodiment of the invention.

FIG. 22 illustrates an optical anti-tamper measure that may be employed in some embodiments of the invention. In this embodiment, the second housing 1503 within the RMU housing comprises a light source 1703 configured to emit a light beam 1704. A plurality of micromirrors 17067 are disposed at particular locations within the interior surface of the housing 1503 and on the RMU memory and controller 1701. The beam 1704 is reflected off of the mirrors 1706 in a predetermined pattern and at predetermined angles to span the interior volume of the housing 1503. The beam impinges on a photodetector 1705. A breach in the housing 1503 interrupts the beam 1704 activating the erasure circuit. In one embodiment, the beam 1704 comprises a thin optical collimated beam. In some embodiments, the beam source 1703 comprises a laser or an optical fiber. In still further embodiments, optical fibers or waveguides may be imbedded in the housing 1503, to provide an optical security envelope in a manner similar to the embodiment described with respect to FIG. 21.

Various aspects of the present invention may be implemented in computing modules. Where components or modules of the invention are implemented in whole or in part using software, in one embodiment, these software elements can be implemented to operate with a computing or processing module capable of carrying out the functionality described with respect thereto. One such example computing module is shown in FIG. 23. Various embodiments are described in terms of this example-computing module 1800. After reading this description, it will become apparent to a person skilled in the relevant art how to implement the invention using other computing modules or architectures.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Referring now to FIG. 23, computing module 1800 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1800 might include, for example, one or more processors, controllers, control modules, or other processing devices, such as a processor 1804. Processor 1804 might be implemented using a general-purpose or special-purpose processing engine such as, for example, a microprocessor, controller, or other control logic. In the illustrated example, processor 1804 is connected to a bus 1802, although any communication medium can be used to facilitate interaction with other components of computing module 1800 or to communicate externally.

Computing module 1800 might also include one or more memory modules, simply referred to herein as main memory 1808. For example, preferably random access memory (RAM) or other dynamic memory, might be used for storing information and instructions to be executed by processor 1804. Main memory 1808 might also be used for storing tempo variables or other intermediate information during execution of instructions to be executed by processor 1804. Computing module 1800 might likewise include a read only memory ("ROW") or other static storage device coupled to bus 1802 for storing static information and instructions for processor 1804.

The computing module 1800 might also include one or more various forms of information storage mechanism 1810, which might include, for example, a media drive 1812 and a storage unit interface 1820. The media drive 1812 might include a drive or other mechanism to support fixed or removable storage media 1814. For example, a hard disk drive, a floppy disk drive, a magnetic tape drive, an optical disk drive, a CD or DVD drive (R or RW), or other removable or fixed media drive might be provided. Accordingly, storage media 1814 might include, for example, a hard disk, a floppy disk, magnetic tape, cartridge, optical disk, a CD or DVD, or other fixed or removable medium that is read by, written to or accessed by media drive 1812. As these examples illustrate, the storage media 1814 can include a computer usable storage medium having stored therein computer software or data.

In alternative embodiments, information storage mechanism 1810 might include other similar instrumentalities for allowing computer programs or other instructions or data to be loaded into computing module 1800. Such instrumentalities might include, for example, a fixed or removable storage unit 1822 and an interface 1820. Examples of such storage units 1822 and interfaces 1820 can include a program cartridge and cartridge interface, a removable memory (for example, a flash memory or other removable memory module) and memory slot, a PCMCIA slot and card, and other fixed or removable storage units 1822 and interfaces 1820 that allow software and data to be transferred from the storage unit 1822 to computing module 1800.

Computing module 1800 might also include a communications interface 1824. Communications interface 1824 might be used to allow software and data to be transferred between computing module 1800 and external devices. Examples of communications interface 1824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1824 might typically be carried on signals, which can be electronic, electromagnetic (which includes optical) or other signals capable of being exchanged by a given communications interface 1824. These signals might be provided to communications interface 1824 via a channel 1828. This channel 1828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1808, storage unit 1820, media 1814, and channel 1828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1800 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," nor "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A memory system, comprising:
 a removable memory unit (RMU) bay, the RMU bay comprising a first doorway and a first hinged door, the first hinged door being biased in a closed position to close the first doorway and configured to open inward toward the interior of the RMU bay;
 a data transfer module comprising a first electrical connector, the first electrical connector being housed in the interior of the RMU bay and being exposed when the first hinged door is opened; and
 an RMU comprising a housing and a computer readable storage medium coupled to a second electrical connector configured to mate with the first electrical connector, the computer readable storage medium and second electrical connector disposed within the housing, and the housing comprising a second doorway and a second hinged door, the second hinged door being biased in a closed position to close the second doorway and configured to open toward the interior of the RMU to expose the second electrical connector;
 wherein the first hinged door is configured to be opened by contact with the RMU housing during insertion of the RMU through the first doorway, and wherein the second hinged door is configured to be opened by contact with the first electrical connector after the RMU is inserted through the first doorway.

2. The memory system of claim 1, wherein one of the first electrical connector or the second electrical connector comprises a plurality of spring-loaded pins, and the remaining one the first electrical connector or the second electrical connector comprises a plurality of contact pads, such that, when the first electrical connector is mated with the second electrical connector, the plurality of spring-loaded pins are depressed and contact the plurality of contact pads.

3. The memory system of claim 2, wherein one of the first electrical connector or the second electrical connector comprises a first wall with a first lip, the first wall being surrounded by a first resilient member; and the remaining one the first electrical connector or the second electrical connector comprises a second wall with a second lip, the second wall surrounding and retaining a second resilient member; and wherein, when first electrical connector is mated with the second electrical connector, the first lip is inserted the second resilient member and is retained by the second resilient member, and the first resilient member contacts the second resilient member.

4. The memory system of claim 3, wherein the first resilient member contacting the second resilient member forms an environmental seal for the plurality of spring-loaded pins contacting the plurality of contact pads.

5. The memory system of claim 1, wherein the RMU bay further comprises projection disposed on an outer surface of the first hinged door, and wherein the RMU further comprises a bottom having an indentation configured to receive the projection when the RMU is fully inserted into the RMU bay to lock the RMU in the fully inserted position.

6. The memory system of claim 1, wherein the doorway is located in a front of the RMU housing, and wherein the front is inclined between 40° and 60° with respect to a bottom of the RMU housing.

7. The memory system of claim 1, wherein the RMU comprises a projection extending through the RMU housing and coupled to a latching member, wherein the latching member is configured to lock the second hinged door in the closed position until the projection is depressed.

8. The memory system of claim 1 wherein the first doorway is configured to depress the projection when the RMU is inserted into the RMU bay before the second hinged door contacts the first electrical connector.

9. The memory system of claim 1, wherein the RMU bay is one of a plurality of RMU bays, the first electrical connector is one of a plurality of electrical connectors housed in respective RMU bays of the plurality of RMU bays, the data transfer module comprises the plurality of electrical connectors that are configured to mate with the second electrical connector housed in the RMU housing.

10. The memory system of claim 9, wherein the plurality of RMU bays are keyed such that the RMU is insertable into fewer than all of the RMU bays.

11. The memory system of claim 9, wherein RMU is insertable into any of the RMU bays.

12. The memory system of claim 9, wherein the data transfer module is coupled to a first bus, the plurality of electrical connectors is coupled to the first bus; and the data transfer module is coupled a second bus, a remote machine is coupled to the second bus, and the data transfer module is configured to transfer data between the RMU and the remote machine via the first and second buses.

13. The memory system of claim 12, wherein a plurality of remote machines are coupled to the second bus, the RMU comprises an identification, and the data transfer module is configured to establish a virtual channel between the RMU and a particular remote machine based on the identification.

14. The memory system of claim 1, wherein the data transfer module is coupled to a first bus, the first electrical connector is coupled to the first bus; and the data transfer module is coupled a second bus, a remote machine is coupled to the second bus, and the data transfer module is configured to transfer data between the RMU and the remote machine via the first and second buses.

15. The memory system of claim 1, wherein the RMU comprises a third electrical connector configured to mate with the first electrical connector, and switch logic configured to couple the second electrical connector or the third electrical connector to the computer readable storage medium depending on a data type of data stored on the computer readable storage medium.

16. The memory system of claim 15, wherein the data transfer module comprises first circuitry configured to transmit data between the RMU and a first remote machine, and second circuitry configured to transmit data between the RMU and a second remote machine, wherein the first circuitry is used if the data stored on the computer readable medium is a first data type and the second circuitry is used if the data stored on the computer readable medium is a second data type.

17. The memory system of claim 1, wherein the RMU comprises a controller coupled to the computer readable storage medium and the second electrical connector, and wherein the controller is configured to erase the computer readable storage medium in response to an erasure command.

18. The memory system of claim 17, wherein the RMU further comprises a second housing containing the computer readable storage medium and the controller, a light source configured to emit a light beam contained in the second housing, a plurality of micromirrors contained in the second housing and affixed to the walls of the second housing, and a photodetector coupled to the controller, wherein micromirrors, light source, and photodetector are positioned such that the light beam reflects off the plurality of micromirrors and is directed onto the photodiode unless the second housing is breached; and wherein the controller is configured to erase the computer readable storage medium if the light beans is not directed onto the photodiode.

19. The memory system of claim 17, wherein the controller is configured trigger physical destruction of the computer storage medium to erase the computer storage medium.

20. The memory system of claim 17, wherein the controller is configured to zeroize the computer storage medium to erase the computer storage medium.

21. The memory system of claim 17, wherein the RMU further comprises an accelerometer coupled to the controller and configured to deliver the erasure command if the accelerometer is subject to more than a predetermined threshold acceleration.

22. The memory system of claim 17, wherein the RMU further comprises a radio subsystem configured to receive the erasure command over a wireless interface.

23. The memory system of claim 17, wherein the RMU further comprises a radio subsystem configured to deliver the erasure command if the RMU is removed from a predetermined region.

24. The memory system of claim 17, wherein the controller is configured to receive the erasure command via the second electrical connector.

25. The memory system of claim 1, wherein the RMU comprises a first portion of an optical authentication system, the first portion of the optical authentication system comprising a first volume of a first optical media having a first index of refraction, and first volume of a second optical media having a second index of refraction, and a first periodic interface between the first volume of the first optical media and the first volume of the second optical media, and a collimated light source;

wherein the RMU bay comprises a second portion of the optical authentication system, the second portion of the optical authentication system comprising a second volume of the first optical media, a second volume of the second optical media, a second periodic interface between the second volume of the first optical media and the second volume of the second optical media, and a photodetector; and wherein the first portion of the optical authentication system and the second portion of the optical authentication system are configured to couple such that the first volume of the second optical media contacts the second volume of the second optical media;

wherein collimated light source is configured to direct collimated light through the periodic interface from the first volume of the first optical media to the first volume of the second optical media and through the second periodic interface from the second volume of the second optical media to the second volume of the first optical media to cause light to exit the second volume of the first optical media; and wherein the second volume of the second optical media have a combined thickness such that the light that exits the second volume of the first optical media is collimated if the first interface and the second interface are copies.

26. The memory system of claim 25, wherein the first periodic interlace comprises a plurality of copies of a diffusion structure.

27. The memory system of claim 25, wherein the first periodic interface comprises a plurality of copies of a predetermined sequence of shapes.

28. A removable memory unit (RMU), comprising:
a housing comprising a first doorway and a first hinged door biased in a closed position to close the first doorway and containing a first electrical connector and a computer readable storage medium, wherein the first hinged door is configured to open toward the interior of the RMU to expose the first electrical connector by contact with a second electrical connector disposed within the housing of an RMU bay;
the first electrical connector coupled to the computer readable storage medium and configured to mate with a second electrical connector coupled to the RMU bay; and
the computer readable storage medium.

29. The RMU of claim 28, wherein one of the first electrical connector or the second electrical connector comprises a plurality of spring-loaded pins, and the remaining one the first electrical connector or the second electrical connector comprises a plurality of contact pads, such that, when the first electrical connector is mated with the second electrical connector, the plurality of spring-loaded pins are depressed and contact the plurality of contact pads.

30. The RMU of claim 29, wherein one of the first electrical connector or the second electrical connector comprises a first wall with a first lip, the first wall being surrounded by a first resilient member; and the remaining one the first electrical connector or the second electrical connector comprises a second wall with a second lip, the second wall surrounding and retaining a second resilient member; and wherein, when first electrical connector is mated with the second electrical connector, the first lip is inserted the second resilient member and is retained by the second resilient member, and the first resilient member contacts the second resilient member.

31. The RMU of claim 28, wherein the housing further comprises a bottom having an indentation configured to receive a projection disposed on a second door of an RMU bay when the RMU is fully inserted into the RMU bay to lock the RMU in the fully inserted position.

32. The RMU of claim 28, wherein the doorway is located in a front of the RMU housing, and wherein the front is inclined between 40° and 60° with respect to a bottom of the RMU housing.

33. The RMU of claim 28, further comprising a projection extending through the RMU housing and coupled to a latching member, wherein the latching member is configured to lock the first hinged door in the closed position until the projection is depressed.

34. The RMU of claim 28, further comprising a third electrical connector configured to mate with the second electrical connector, and switch logic configured to couple the first electrical connector or the third electrical connector to the computer readable storage medium depending on a data type of data stored on the computer readable storage medium.

35. The RMU of claim 28, further comprising a controller coupled to the computer readable storage medium and the first electrical connector, and wherein the controller is configured to erase the computer readable storage medium in response to an erasure command.

36. The RMU of claim 35, further comprising a second housing containing the computer readable storage medium and the controller, a light source configured to emit a light beam contained in the second housing, a plurality of micromirrors contained in the second housing and affixed to the walls of the second housing, and a photodetector coupled to the controller, wherein micromirrors, light source, and photodetector are positioned such that the light beam reflects off the plurality of micromirrors and is directed onto the photodiode unless the second housing is breached; and wherein the controller is configured to erase the computer readable storage medium if the light beam is not directed onto the photodiode.

37. The RMU of claim 35, wherein the controller is configured trigger physical destruction of the computer storage medium to erase the computer storage medium.

38. The RMU of claim 35, wherein the controller is configured to zeroize the computer storage medium to erase the computer storage medium.

39. The RMU of claim 35, further comprising an accelerometer coupled to the controller and configured to deliver the erasure command if the accelerometer is subject to more than a predetermined threshold acceleration.

40. The RMU of claim 35, further comprising a radio subsystem configured to receive the erasure command over a wireless interface.

41. The RMU of claim 35, further comprising a radio subsystem configured to deliver the erasure command if the RMU is removed from a predetermined region.

42. The RMU of claim 35, wherein the controller is configured to receive the erasure command via the first electrical connector.

43. The RMU of claim 28, further comprising a first portion of an optical authentication system, the first portion of the optical authentication system comprising a first volume of a first optical media having a first index of refraction, and first volume of a second optical media having a second index of refraction, and a first periodic interface between the first volume of the first optical media and the first volume of the second optical media, and a collimated light source;

wherein the RMU bay comprises a second portion of the optical authentication system, the second portion of the optical authentication system comprising a second volume of the first optical media, a second volume of the second optical media, a second periodic interface between the second volume of the first optical media and the second volume of the second optical media, and a photodetector; and wherein the first portion of the optical authentication system and the second portion of the optical authentication system are configured to couple such that the first volume of the second optical media contacts the second volume of the second optical media;

wherein collimated light source is configured to direct collimated light through the periodic interface from the first volume of the first optical media to the first volume of the second optical media and through the second periodic interface from the second volume of the second optical media to the second volume of the first optical media to cause light to exit the second volume of the first optical media; and wherein the second volume of the second optical media have a combined thickness such that the light that exits the second volume of the first optical media is collimated if the first interface and the second interface are copies.

44. The RMU of claim 43, wherein the first periodic interface comprises a plurality of copies of a diffusion structure.

45. The RMU of claim 43, wherein the first periodic interface comprises a plurality of copies of a predetermined fined sequence of shapes.

46. A method of manufacturing a memory system, comprising:

providing a removable memory unit (RMU) bay, the RMU bay comprising a first doorway and a first hinged door, the first hinged door being biased in a closed position to close the first doorway and configured to open inward toward the interior of the RMU providing a data transfer module comprising a first electrical connector, the first electrical connector being housed in the interior of the RMU bay and being exposed when the first hinged door is opened; and providing an RMU comprising a housing and a computer readable storage medium coupled to a second electrical connector configured to mate with the first electrical connector, the computer readable storage medium and second electrical connector disposed within the housing, and the housing comprising a second doorway and a second hinged door, the second hinged door being biased in a closed position to close the second doorway and configured to open toward the interior of the RMU to expose the second electrical connector;

wherein the first hinged door is configured to be opened by contact with the RMU housing during insertion of the RMU through the first doorway, and wherein the second hinged door is configured to be opened by contact with the first electrical connector after the RMU is inserted through the first doorway.

47. A method of using a memory system, comprising:

inserting a removable memory unit (RMU) into an RMU bay to mate a first electrical connector coupled to a data transfer module with a second electrical connector coupled to a computer storage medium, wherein:

the RMU bay comprises a first doorway and a first hinged door, the first hinged door being biased in a closed position to close the first doorway and configured to open inward toward the interior of the RMU bay;

the data transfer module comprises the first electrical connector, the first electrical connector being housed in the interior of the RMU bay and being exposed when the first hinged door is opened; and the RMU comprising a housing and the computer readable storage medium coupled to the second electrical connector, the computer readable storage medium and second electrical connector disposed within the housing, and the housing comprising a second doorway and a second hinged door, the second hinged door being biased in a closed position to close the second doorway and configured to open toward the interior of the RMU to expose the second electrical connector;

wherein the first hinged door is configured to be opened by contact with the RMU housing during insertion of the RMU through the first doorway, and wherein the second hinged door is configured to be opened by contact with the first electrical connector after the RMU is inserted through the first doorway.

* * * * *